United States Patent
Hopkins et al.

(10) Patent No.: US 12,518,826 B2
(45) Date of Patent: Jan. 6, 2026

(54) METHOD USED IN FORMING A MEMORY ARRAY COMPRISING STRINGS OF MEMORY CELLS COMPRISING FORMING TRENCHES BETWEEN MEMORY-BLOCK REGIONS AFTER FORMING TRENCHES TO FORM LATERALLY-SPACED SUB-BLOCK REGIONS IN THE MEMORY-BLOCK REGIONS

(71) Applicant: Micron Technology, Inc., Boise, ID (US)

(72) Inventors: John D. Hopkins, Meridian, ID (US); Jordan D. Greenlee, Boise, ID (US); Alyssa N. Scarbrough, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 578 days.

(21) Appl. No.: 17/377,949

(22) Filed: Jul. 16, 2021

(65) Prior Publication Data
US 2023/0021060 A1 Jan. 19, 2023

(51) Int. Cl.
*G11C 16/04* (2006.01)
*H10B 41/10* (2023.01)
(Continued)

(52) U.S. Cl.
CPC ......... *G11C 16/0483* (2013.01); *H10B 41/10* (2023.02); *H10B 41/27* (2023.02);
(Continued)

(58) Field of Classification Search
CPC .... G11C 16/0483; H10B 41/10; H10B 43/35; H10B 41/35; H10B 43/10; H10B 41/27; H10B 43/27
See application file for complete search history.

(56) References Cited

U.S. PATENT DOCUMENTS

| 11,049,568 B1* | 6/2021 | Yada | H10B 43/27 |
| 2014/0131784 A1* | 5/2014 | Davis | H10B 41/27 438/589 |

(Continued)

*Primary Examiner* — Norman D Richards
*Assistant Examiner* — Sean Ayers Winters
(74) *Attorney, Agent, or Firm* — Wells St. John P.S.

(57) ABSTRACT

A method used in forming a memory array comprising strings of memory cells comprises forming a conductor tier comprising conductor material on a substrate. Laterally-spaced memory-block regions individually comprise a vertical stack comprising alternating first tiers and second tiers are formed directly above the conductor tier. Channel-material strings of memory cells extend through the first tiers and the second tiers. A lower of the first tiers comprises sacrificial material. A horizontally-elongated slot is formed through the first and second tiers to the sacrificial material in individual of the memory-block regions to form laterally-spaced sub-block regions in the individual memory-block regions. The sacrificial material is isotropically etched from the lower first tier through the horizontally-elongated slots. After the isotropic etching, conducting material is formed in the horizontally-elongated slots and in the lower first tier that directly electrically couples together the channel material of individual of the channel-material strings and the conductor material of the conductor tier. After forming the conducting material, horizontally-elongated trenches are formed through the first tiers and the second tiers and that are individually laterally between immediately-adjacent of the memory-block regions. Other embodiments, including structure independent of method, are disclosed.

19 Claims, 15 Drawing Sheets

(51) Int. Cl.
  *H10B 41/27* (2023.01)
  *H10B 41/35* (2023.01)
  *H10B 43/10* (2023.01)
  *H10B 43/27* (2023.01)
  *H10B 43/35* (2023.01)

(52) U.S. Cl.
  CPC ............ *H10B 41/35* (2023.02); *H10B 43/10* (2023.02); *H10B 43/27* (2023.02); *H10B 43/35* (2023.02)

(56) References Cited

U.S. PATENT DOCUMENTS

| | | | |
|---|---|---|---|
| 2014/0191306 A1* | 7/2014 | Hopkins | H01L 29/511 |
| | | | 257/315 |
| 2017/0148810 A1* | 5/2017 | Kai | H10B 43/35 |
| 2018/0122904 A1* | 5/2018 | Matsumoto | H10B 43/27 |
| 2018/0261671 A1* | 9/2018 | Matsumoto | H10B 41/35 |
| 2020/0144283 A1* | 5/2020 | Kim | H10B 43/27 |

* cited by examiner

METHOD USED IN FORMING A MEMORY ARRAY COMPRISING STRINGS OF MEMORY CELLS COMPRISING FORMING TRENCHES BETWEEN MEMORY-BLOCK REGIONS AFTER FORMING TRENCHES TO FORM LATERALLY-SPACED SUB-BLOCK REGIONS IN THE MEMORY-BLOCK REGIONS

TECHNICAL FIELD

Embodiments disclosed herein pertain to memory arrays comprising strings of memory cells and to methods used in forming a memory array comprising strings of memory cells.

BACKGROUND

Memory is one type of integrated circuitry and is used in computer systems for storing data. Memory may be fabricated in one or more arrays of individual memory cells. Memory cells may be written to, or read from, using digitlines (which may also be referred to as bitlines, data lines, or sense lines) and access lines (which may also be referred to as wordlines). The sense lines may conductively interconnect memory cells along columns of the array, and the access lines may conductively interconnect memory cells along rows of the array. Each memory cell may be uniquely addressed through the combination of a sense line and an access line.

Memory cells may be volatile, semi-volatile, or non-volatile. Non-volatile memory cells can store data for extended periods of time in the absence of power. Non-volatile memory is conventionally specified to be memory having a retention time of at least about 10 years. Volatile memory dissipates and is therefore refreshed/rewritten to maintain data storage. Volatile memory may have a retention time of milliseconds or less. Regardless, memory cells are configured to retain or store memory in at least two different selectable states. In a binary system, the states are considered as either a "0" or a "1". In other systems, at least some individual memory cells may be configured to store more than two levels or states of information.

A field effect transistor is one type of electronic component that may be used in a memory cell. These transistors comprise a pair of conductive source/drain regions having a semiconductive channel region there-between. A conductive gate is adjacent the channel region and separated there-from by a thin gate insulator. Application of a suitable voltage to the gate allows current to flow from one of the source/drain regions to the other through the channel region. When the voltage is removed from the gate, current is largely prevented from flowing through the channel region. Field effect transistors may also include additional structure, for example a reversibly programmable charge-storage region as part of the gate construction between the gate insulator and the conductive gate.

Flash memory is one type of memory and has numerous uses in modern computers and devices. For instance, modern personal computers may have BIOS stored on a flash memory chip. As another example, it is becoming increasingly common for computers and other devices to utilize flash memory in solid state drives to replace conventional hard drives. As yet another example, flash memory is popular in wireless electronic devices because it enables manufacturers to support new communication protocols as they become standardized, and to provide the ability to remotely upgrade the devices for enhanced features.

NAND may be a basic architecture of integrated flash memory. A NAND cell unit comprises at least one selecting device coupled in series to a serial combination of memory cells (with the serial combination commonly being referred to as a NAND string). NAND architecture may be configured in a three-dimensional arrangement comprising vertically-stacked memory cells individually comprising a reversibly programmable vertical transistor. Control or other circuitry may be formed below the vertically-stacked memory cells. Other volatile or non-volatile memory array architectures may also comprise vertically-stacked memory cells that individually comprise a transistor.

Memory arrays may be arranged in memory pages, memory blocks and partial blocks (e.g., sub-blocks), and memory planes, for example as shown and described in any of U.S. Patent Application Publication Nos. 2015/0228651, 2016/0267984, and 2017/0140833. The memory blocks may at least in part define longitudinal outlines of individual wordlines in individual wordline tiers of vertically-stacked memory cells. Connections to these wordlines may occur in a so-called "stair-step structure" at an end or edge of an array of the vertically-stacked memory cells. The stair-step structure includes individual "stairs" (alternately termed "steps" or "stair-steps") that define contact regions of the individual wordlines upon which elevationally-extending conductive vias contact to provide electrical access to the wordlines.

DETAILED DESCRIPTION OF EXAMPLE EMBODIMENTS

Figure 1:
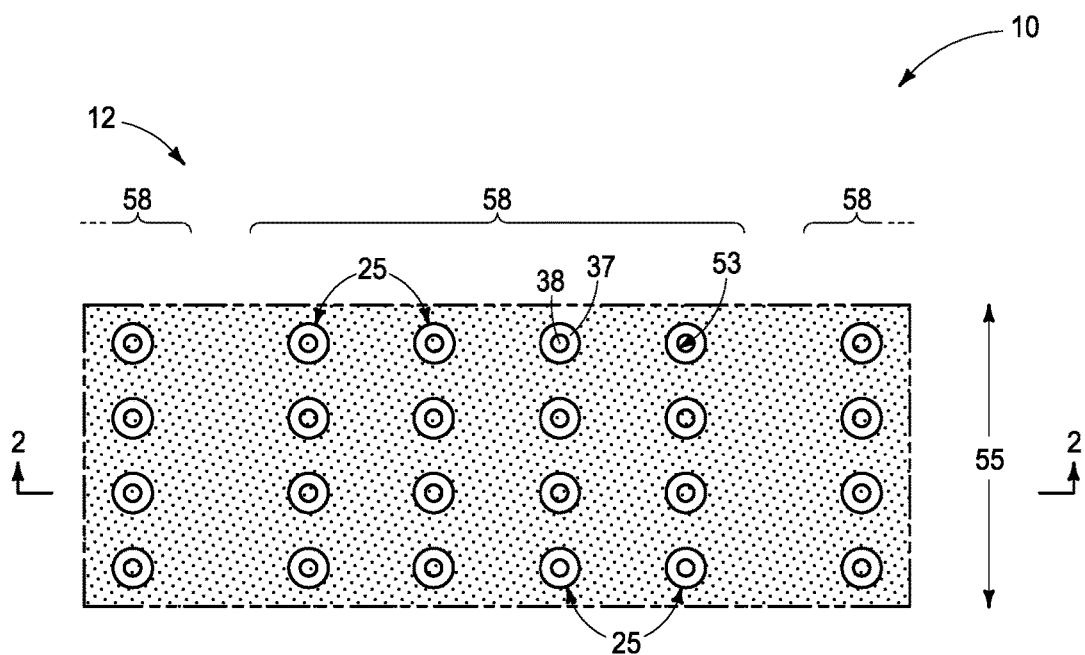
FIGS. 1-4 are diagrammatic cross-sectional views of portions of what will be an array of elevationally-extending strings of memory cells in accordance with an embodiment of the invention.
Figure 2:
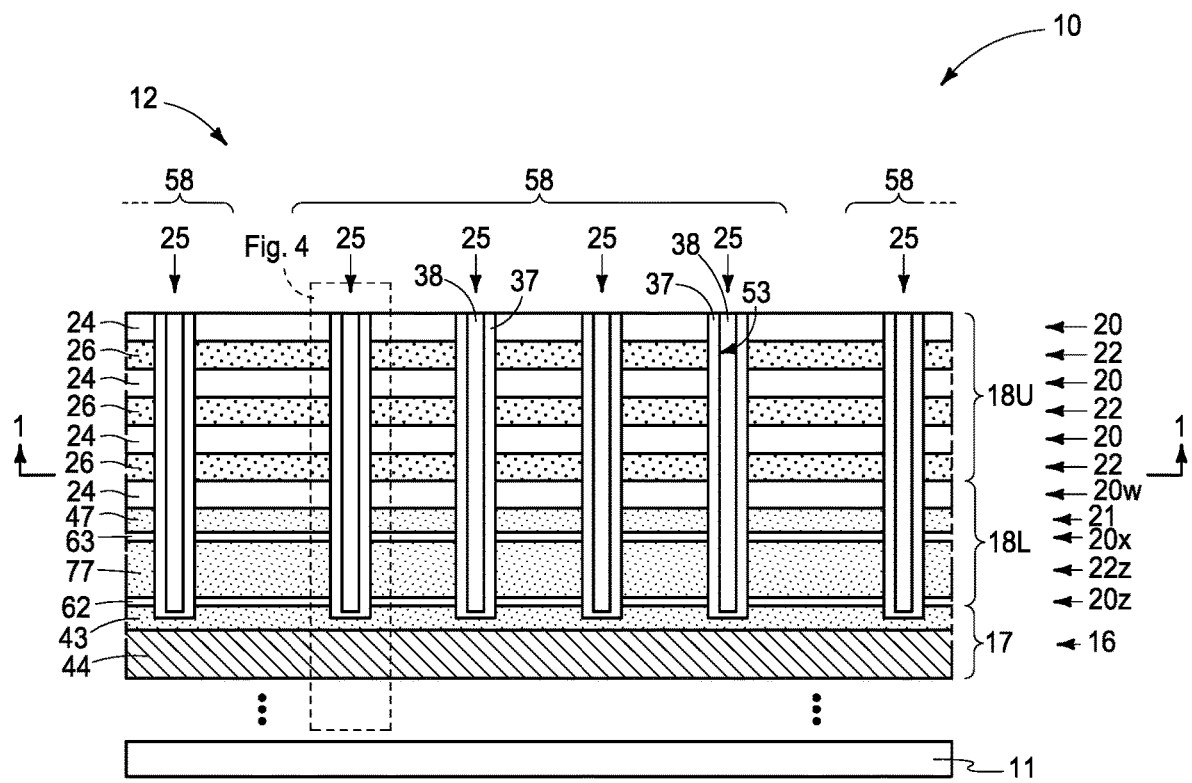
Figure 3:
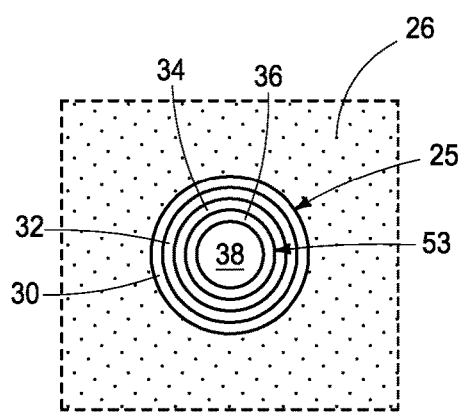
Figure 4:
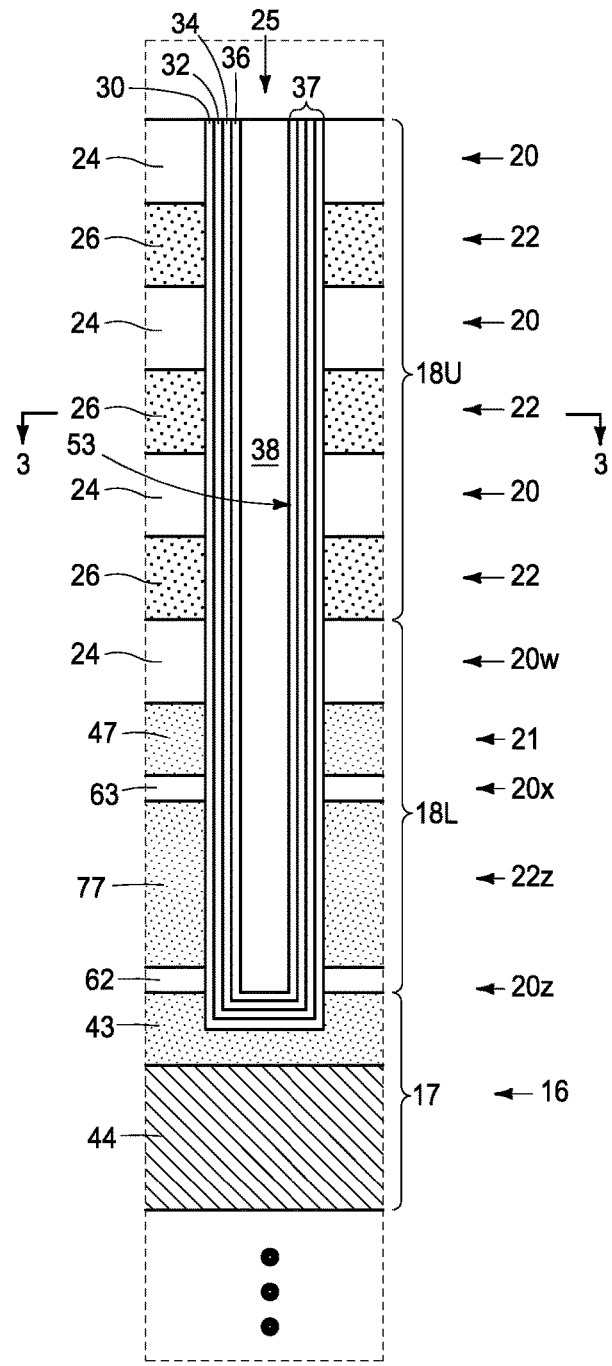

Embodiments of the invention encompass methods used in forming a memory array, for example an array of NAND or other memory cells that may have at least some peripheral control circuitry under the array (e.g., CMOS-under-array). Embodiments of the invention encompass so-called "gate-last" or "replacement-gate" processing, so-called "gate-first" processing, and other processing whether existing or future-developed independent of when transistor gates are formed. Embodiments of the invention also encompass a memory array (e.g., NAND architecture) independent of method of manufacture. First example method embodiments are described with reference to FIGS. 1-27 which may be considered as a "gate-last" or "replacement-gate" process, and starting with FIGS. 1-4.

FIGS. 1-4 show a construction 10 having an array or array area 12 in which elevationally-extending strings of transistors and/or memory cells will be formed. Construction 10 comprises a base substrate 11 having any one or more of conductive/conductor/conducting, semiconductive/semi-conductor/semiconducting, or insulative/insulator/insulating (i.e., electrically herein) materials. Various materials have been formed elevationally over base substrate 11. Materials may be aside, elevationally inward, or elevationally outward of the depicted materials. For example, other partially or wholly fabricated components of integrated circuitry may be provided somewhere above, about, or within base substrate 11. Control and/or other peripheral circuitry for operating components within an array (e.g., array 12) of elevationally-extending strings of memory cells may also be fabricated and may or may not be wholly or partially within an array or sub-array. Further, multiple sub-arrays may also be fabricated and operated independently, in tandem, or otherwise relative one another. In this document, a "sub-array" may also be considered as an array.

A conductor tier 16 comprising conductor material 17 has been formed above substrate 11. Conductor material 17 a shown comprises upper conductor material 43 directly above and directly electrically coupled to (e.g., directly against) lower conductor material 44 of different composition from upper conductor material 43. In one embodiment, upper conductor material 43 comprises conductively-doped semiconductive material (e.g., n-type-doped or p-type-doped polysilicon). In one embodiment, lower conductor material 44 comprises metal material (e.g., a metal silicide such as $WSi_x$). Conductor tier 16 may comprise part of control circuitry (e.g., peripheral-under-array circuitry and/or a common source line or plate) used to control read and write access to the transistors and/or memory cells that will be formed within array 12.

A lower portion 18L of a stack 18* has been formed above substrate 11 and conductor tier 16 (an * being used as a suffix to be inclusive of all such same-numerically-designated components that may or may not have other suffixes). Stack 18* will comprise vertically-alternating conductive tiers 22* and insulative tiers 20*, with material of tiers 22* being of different composition from material of tiers 20*. Stack 18* comprises laterally-spaced memory-block regions 58 that will comprise laterally-spaced memory blocks 58 in a finished circuitry construction. In this document, unless otherwise indicated, "block" is generic to include "sub-block". Memory-block regions 58 and resultant memory blocks 58 (not yet shown) may be considered as being longitudinally elongated and oriented, for example along a direction 55. Memory-block regions 58 may not be discernable at this point of processing.

Conductive tiers 22* (alternately referred to as first tiers) may not comprise conducting material and insulative tiers 20* (alternately referred to as second tiers) may not comprise insulative material or be insulative at this point in processing in conjunction with the hereby initially-described example method embodiment which is "gate-last" or "replacement-gate". In one embodiment, lower portion 18L comprises a lowest tier 20z of second tiers 20* directly above (e.g., directly against) conductor material 17. Example lowest second tier 20z is insulative and may be sacrificial (e.g., comprising material 62, and in some embodiments is referred to as lower insulative material). A next-lowest second tier 20x of second tiers 20* is directly above lowest second tier 20z (e.g., comprising material 63, and in some embodiments referred to as upper insulative material). A lowest tier 22z of first tiers 22* comprising sacrificial material 77 (e.g., polysilicon or silicon nitride; e.g., in some embodiments referred to as intermediate material) is vertically between lowest second tier 20z and next-lowest second tier 20x. In some embodiments, lowest tier 22z may be considered and referred to as a lower first tier or a lower conductive tier (i.e., regardless of whether such is the lowest first/conductive tier). In one embodiment, lower portion 18L comprises a conducting-material tier 21 comprising conducting material 47 (e.g., conductively-doped polysilicon) that is directly above next-lowest second tier 20x. In one embodiment, lower portion 18L comprises an uppermost tier, for example a next-next lowest second tier 20w (e.g., comprising material 24, for example silicon dioxide). Tiers 20w and 21 may be of the same or of different thickness(es) relative one another. Additional tiers may be present. For example, one or more additional tiers may be above tier 20w (tier 20w thereby not being the uppermost tier in portion 18L, and not shown), between tier 20w and tier 21 (not shown), and/or below tier 22z (other than 20z not being shown).

An upper portion 18U of stack 18* has been formed above lower portion 18L. Upper portion 18U comprises vertically-alternating different composition first tiers 22 and second tiers 20. First tiers 22 may be conductive and second tiers 20 may be insulative, yet need not be so at this point of processing in conjunction with the hereby initially-described example method embodiment which is "gate-last" or "replacement-gate". Example first tiers 22 and second tiers 20 comprise different composition materials 26 and 24 (e.g., silicon nitride and silicon dioxide), respectively. Example upper portion 18U is shown starting above lower portion 18L with a first tier 22 although such could alternately start with a second tier 20 (not shown). Further, and by way of example, lower portion 18L may be formed to have one or more first and/or second tiers as a top thereof. Regardless, only a small number of tiers 20 and 22 is shown, with more likely upper portion 18U (and thereby stack 18*) comprising dozens, a hundred or more, etc. of tiers 20 and 22. Further, other circuitry that may or may not be part of peripheral and/or control circuitry may be between conductor tier 16 and stack 18*. By way of example only, multiple vertically-alternating tiers of conductive material and insulative material of such circuitry may be below a lowest of conductive tiers 22* and/or above an uppermost of conductive tiers 22*. For example, one or more select gate tiers (not shown) may be between conductor tier 16 and the lowest conductive tier 22* and one or more select gate tiers may be above an uppermost of conductive tiers 22*. Alternately or additionally, at least one of the depicted uppermost and lowest conductive tiers 22 may be a select gate tier.

Channel openings 25 have been formed (e.g., by etching) through second tiers 20 and first tiers 22 in upper portion 18U to conductor tier 16 in lower portion 18L (e.g., at least to lowest first tier 22z) in lower portion 18L. Channel openings 25 may taper radially-inward (not shown) moving deeper in stack 18. In some embodiments, channel openings 25 may go into conductor material 17 of conductor tier 16 as shown or may stop there-atop (not shown). Alternately, as an example, channel openings 25 may stop atop or within the lowest second tier 20z. A reason for extending channel openings 25 at least to conductor material 17 of conductor tier 16 is to provide an anchoring effect to material that is within channel openings 25. Etch-stop material (not shown) may be within or atop conductive material 17 of conductor tier 16 to facilitate stopping of the etching of channel openings 25 relative to conductor tier 16 when such is desired. Such etch-stop material may be sacrificial or non-sacrificial. By way of example and for brevity only, channel openings 25 are shown as being arranged in groups of four channel openings 25 per row within individual memory-block regions 58. Space between immediately-adjacent memory-block regions 58 (in which trenches 40 will subsequently be formed as described below) will typically be wider than channel openings 25 (e.g., 10 to 20 times wider, yet such wider degree not being shown in the figures for brevity). Any alternate arrangement and construction may be used.

Transistor channel material may be formed in the individual channel openings elevationally along the insulative tiers and the conductive tiers, thus comprising individual channel-material strings, which is directly electrically coupled with conductive material in the conductor tier. Individual memory cells of the example memory array being formed may comprise a gate region (e.g., a control-gate region) and a memory structure laterally-between the gate region and the channel material. In one such embodiment, the memory structure is formed to comprise a charge-blocking region, storage material (e.g., charge-storage material), and an insulative charge-passage material. The storage material (e.g., floating gate material such as doped or undoped silicon or charge-trapping material such as silicon nitride, metal dots, etc.) of the individual memory cells is elevationally along individual of the charge-blocking regions. The insulative charge-passage material (e.g., a band gap-engineered structure having nitrogen-containing material [e.g., silicon nitride] sandwiched between two insulator oxides [e.g., silicon dioxide]) is laterally-between the channel material and the storage material.

In one embodiment and as shown, charge-blocking material 30, storage material 32, and charge-passage material 34 have been formed in individual channel openings 25 elevationally along insulative tiers 20 and conductive tiers 22. Transistor materials 30, 32, and 34 (e.g., memory-cell materials) may be formed by, for example, deposition of respective thin layers thereof over stack 18 and within individual channel openings 25 followed by planarizing such back at least to a top surface of stack 18 as shown.

Channel material 36 as a channel-material string 53 has also been formed in channel openings 25 elevationally along insulative tiers 20 and conductive tiers 22. Materials 30, 32, 34, and 36 are collectively shown as and only designated as material 37 in some figures due to scale. Example channel materials 36 include appropriately-doped crystalline semiconductor material, such as one or more silicon, germanium, and so-called III/V semiconductor materials (e.g., GaAs, InP, GaP, and GaN). Example thickness for each of materials 30, 32, 34, and 36 is 25 to 100 Angstroms. Punch etching may be conducted to remove materials 30, 32, and 34 from the bases of channel openings 25 (not shown) to expose conductor tier 16 such that channel material 36 is directly against conductor material 17 of conductor tier 16. Such punch etching may occur separately with respect to each of materials 30, 32, and 34 (as shown) or may occur with respect to only some (not shown). Alternately, and by way of example only, no punch etching may be conducted and channel material 36 may be directly electrically coupled to conductor material 17 of conductor tier 16 only by a separate conductive interconnect (not yet shown). Regardless, sacrificial etch-stop plugs (not shown) may be formed in lower portion 18L in horizontal locations where channel openings 25 will be prior to forming upper portion 18U. Channel openings 25 may then be formed by etching materials 24 and 26 to stop on or within the material of the sacrificial plugs, followed by exhuming remaining material of such plugs prior to forming material in channel openings 25. A radially-central solid dielectric material 38 (e.g., spin-on-dielectric, silicon dioxide, and/or silicon nitride) is shown in channel openings 25. Alternately, and by way of example only, the radially-central portion within channel openings 25 may include void space(s) (not shown) and/or be devoid of solid material (not shown).

Figure 5:
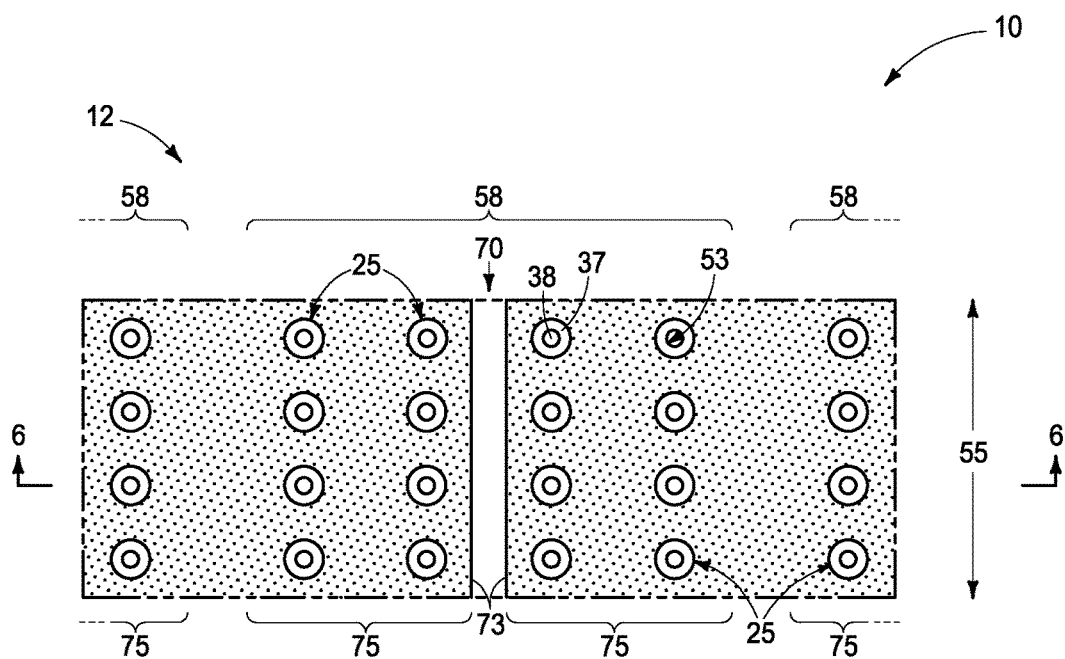
FIGS. 5-28 are diagrammatic sequential sectional and/or enlarged views of the construction of FIGS. 1-4, or portions thereof or alternate and/or additional embodiments, in process in accordance with some embodiments of the invention.
Figure 6:
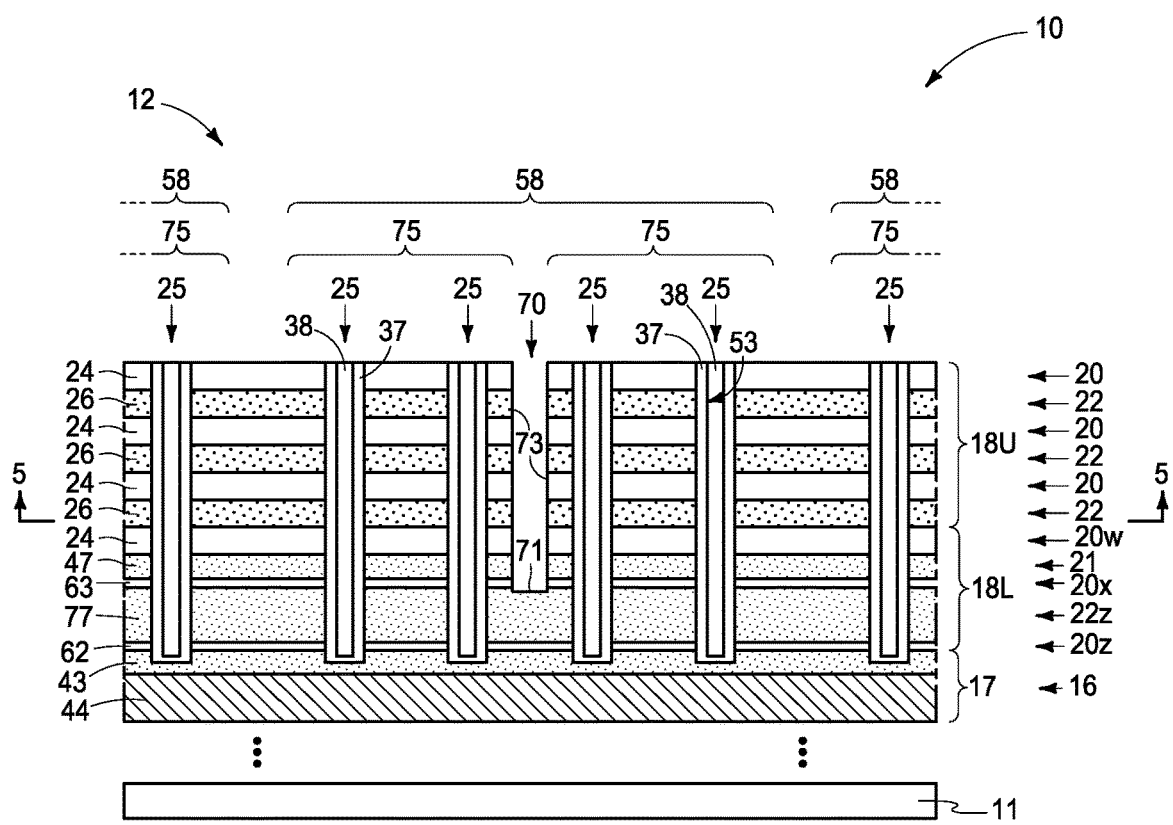

Referring to FIGS. 5 and 6, a horizontally-elongated slot 70 has been formed through first and second tiers 22*, 20* (e.g., by anisotropic etching) to sacrificial material 77 in individual of memory-block regions 58 to form laterally-spaced sub-block regions 75 in individual memory-block regions 58. Two sub-block regions 75 are shown although more slots 70, or other slots, and thereby more sub-block regions 75, may be formed (not shown). Slots 70 may taper laterally-inward in vertical cross-section moving deeper into stack 18*. Slots 70 may be formed to initially extend to material 77 of lower first tier 22z. As one example, slots 70 may initially be formed by etching materials 24, 26, 47, and 63 (likely using different anisotropic etching chemistries) and that stops on or within sacrificial material 77. Alternately, and by way of example only, a sacrificial etch-stop line (not shown) having the same general horizontal outline as slots 70 may individually be formed in conducting tier 21 (when present) and/or in tier 20x before forming upper portion 18U. Slots 70 may then be formed by etching materials 24 and 26 to stop on or within the material of the individual sacrificial lines, followed by exhuming remaining material of such sacrificial lines to extend slots 70 to sacrificial material 77. Slots 70 may be considered as individually having sidewalls 73 and a bottom 71. In one embodiment, channel material 36 of the channel-material strings 53 has been formed prior to forming horizontally-elongated slots 70.

Figure 7:
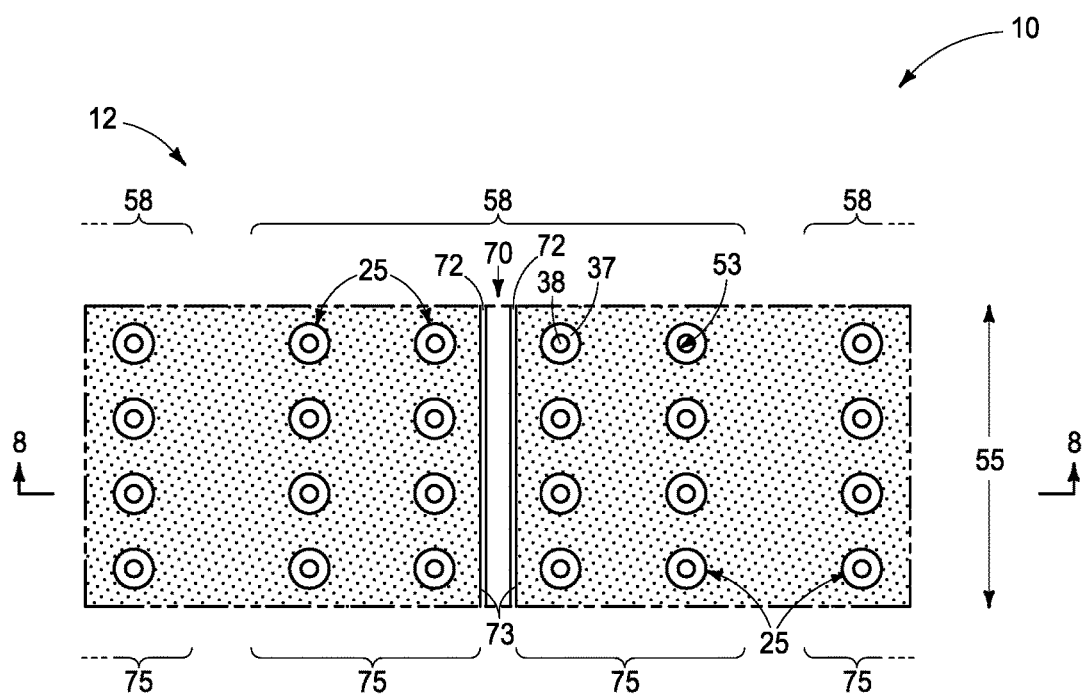
Figure 8:
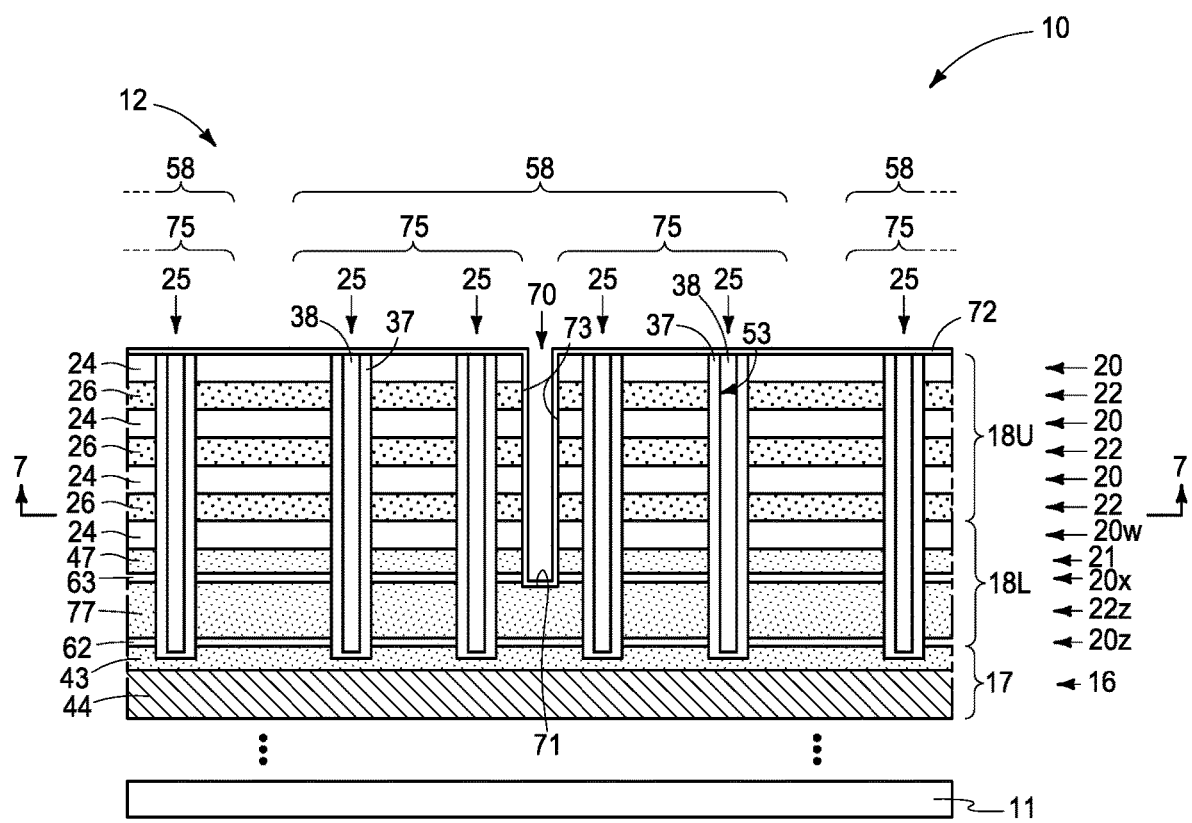

Referring to FIGS. 7 and 8, and in one embodiment, an insulative lining 72 has been formed against sidewalls 73 of slots 70 and in one such embodiment against bottoms 71. Example linings include one or more layers of silicon dioxide, silicon nitride, and/or polysilicon.

Figure 9:
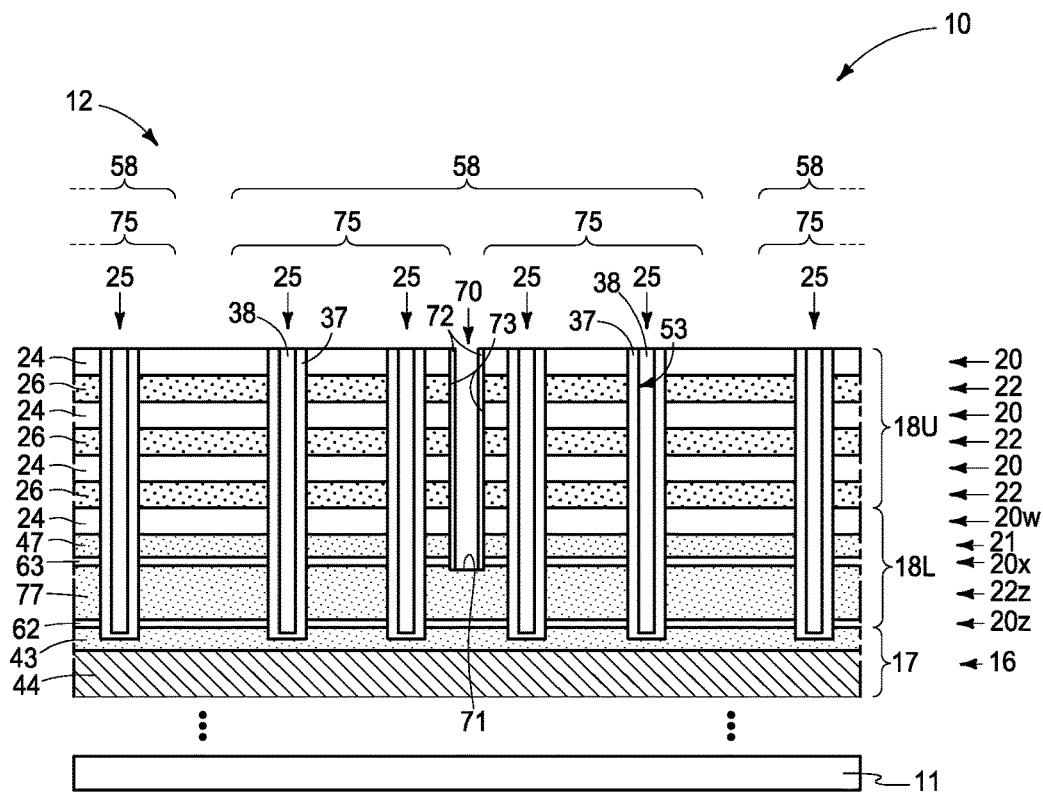

Referring to FIG. 9, insulative lining 72 has been removed (e.g., by etching) from being centrally over bottoms 71 of slots 70 to expose sacrificial material 77.

Figure 10:
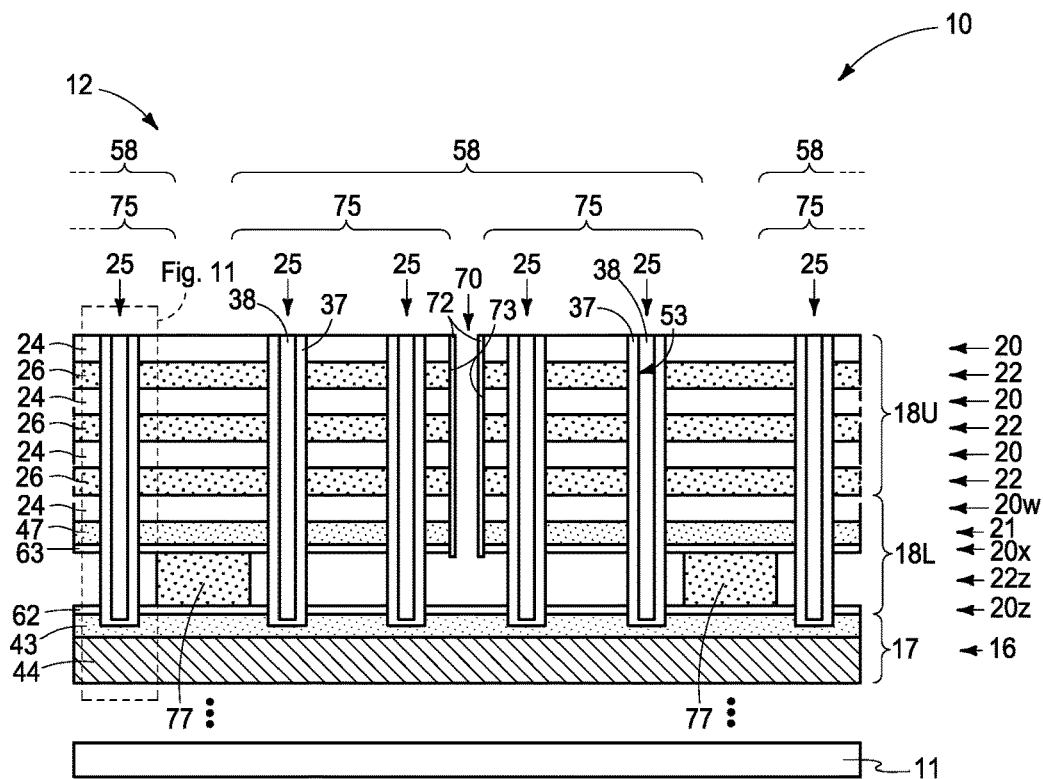
Figure 11:
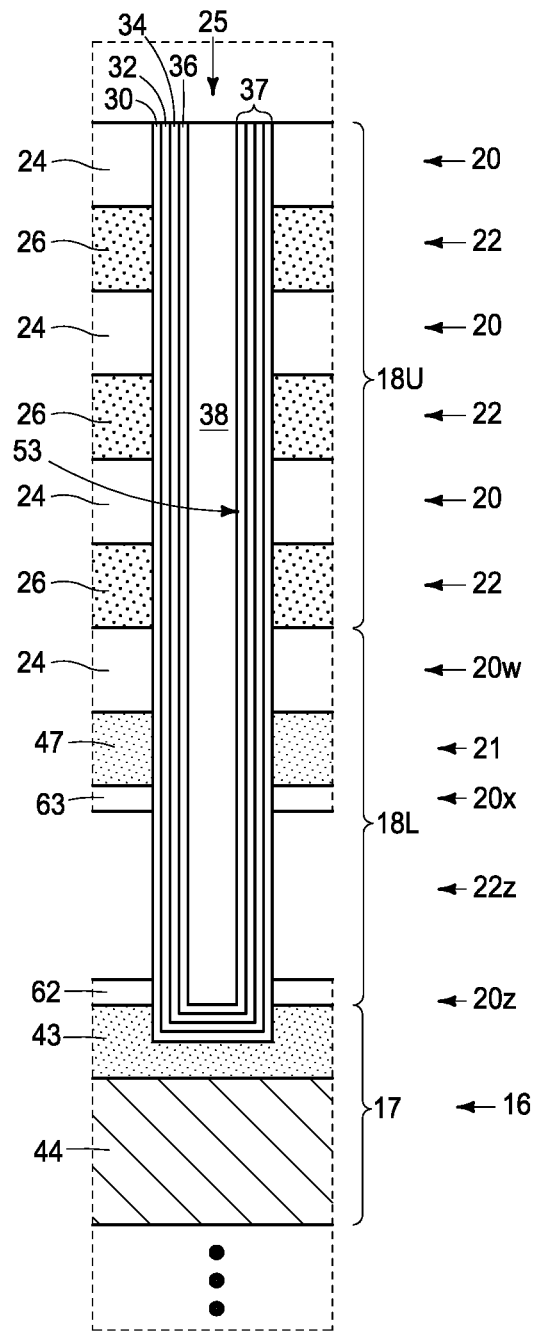

Referring to FIGS. 10 and 11, sacrificial material 77 has been isotropically etched from lower first tier 22z through horizontally-elongated slots 70. Such may occur, for example, by isotropic etching that is ideally conducted selectively relative to materials 62 and 63 (e.g., where materials 62 and 63 are each one of a hafnium oxide or the $SiO_xN_y$, using liquid or vapor $H_3PO_4$ as a primary etchant where material 77 is silicon nitride or using tetramethyl ammonium hydroxide [TMAH] where material 77 is polysilicon). In one embodiment and as shown, the isotropically etching removes less-than-all of sacrificial material 77 from the lower first tier 22z in memory-block regions 58 and in one such embodiment leaves sacrificial material 77 to extend continuously laterally between immediately-adjacent memory-block regions 58 in lower first tier 22z. In one embodiment, at least some of remaining such sacrificial material 77 remains in a finished construction of the memory array being formed. Additional lining material (not shown) may be formed over insulative lining 72 prior to isotropically etching sacrificial material 77.

Figure 12:
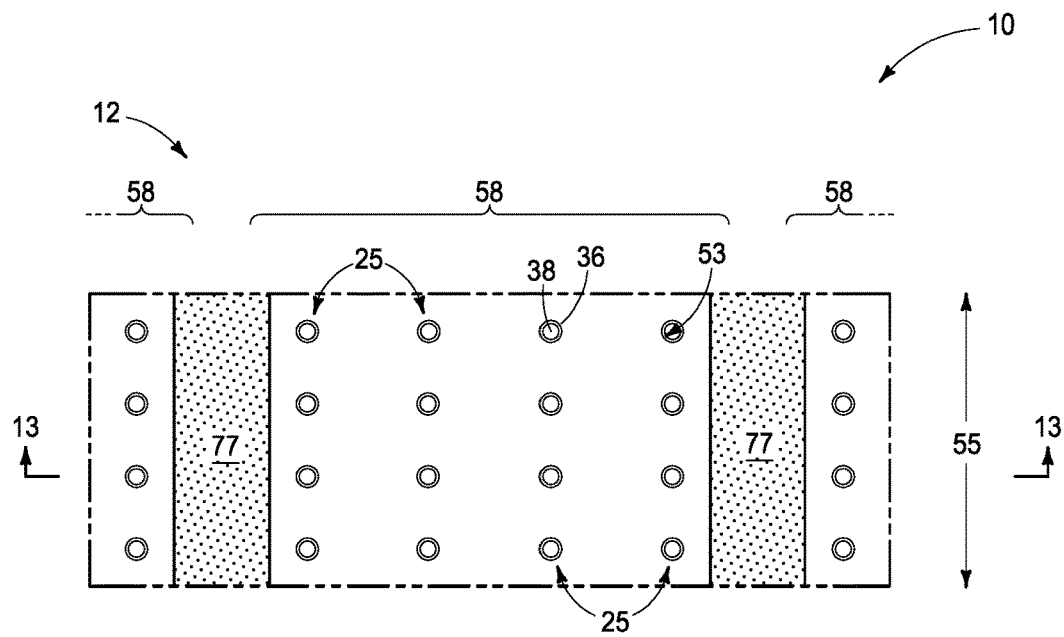
Figure 13:
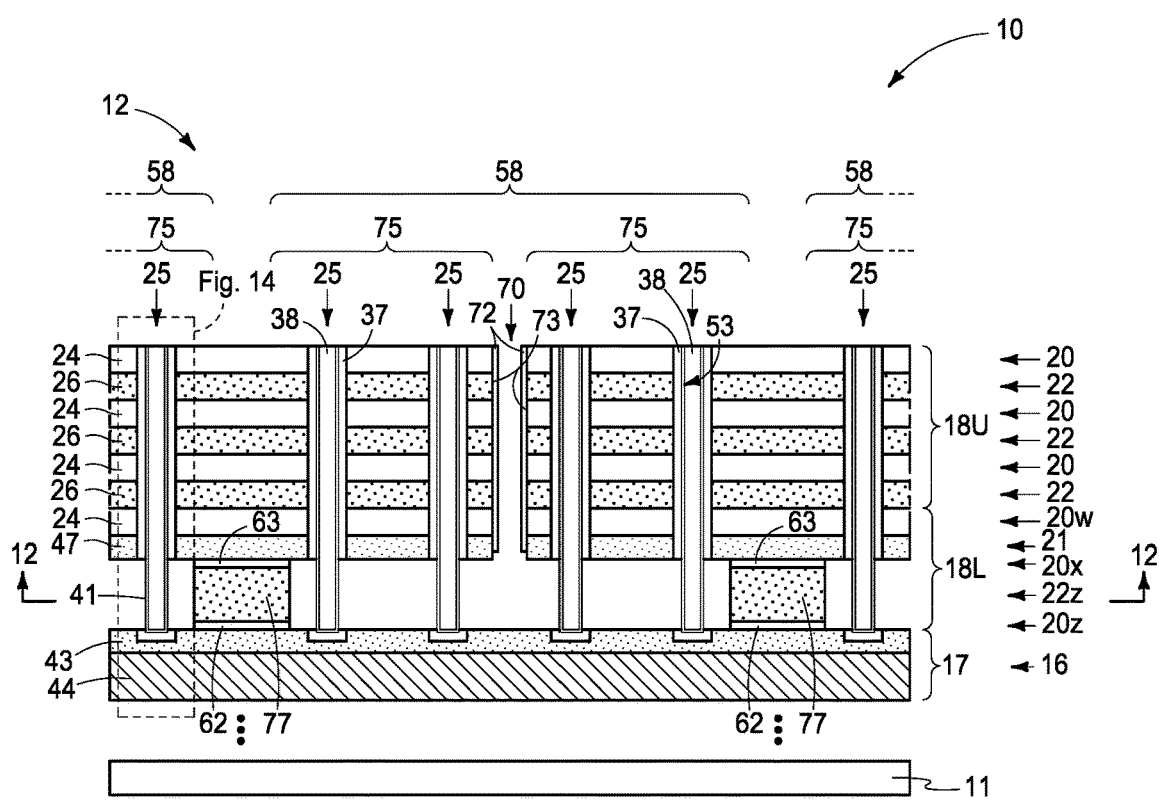
Figure 14:
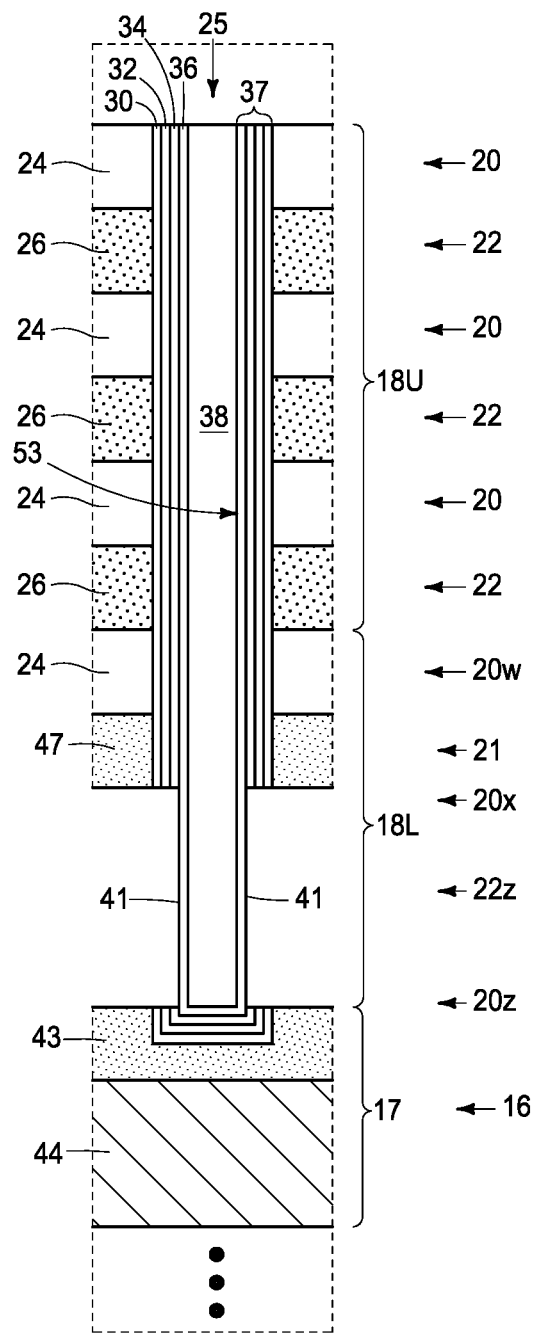
Figure 15:
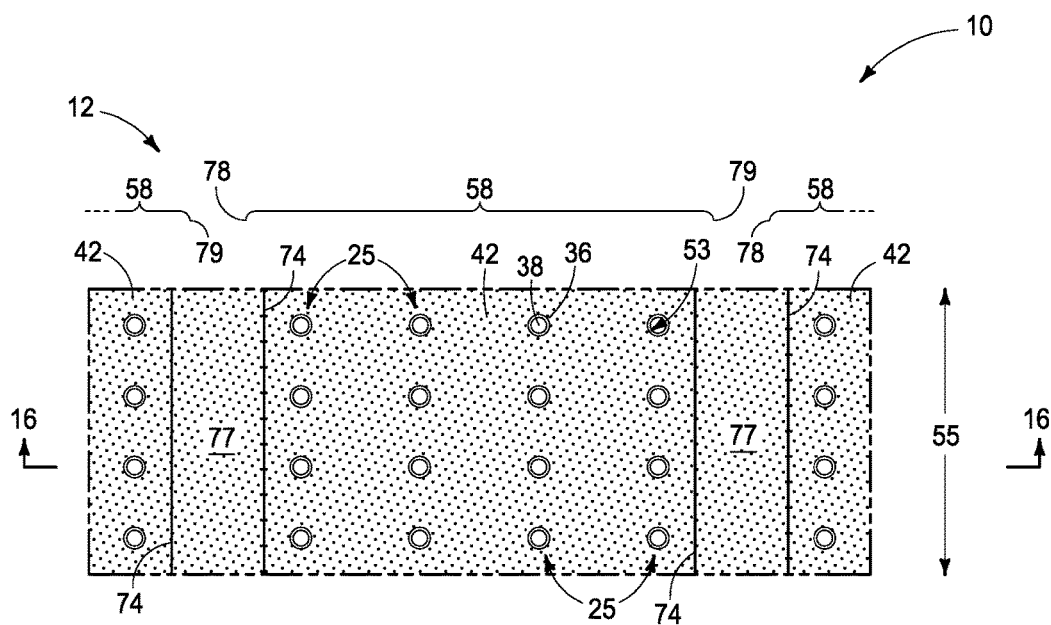
Figure 16:
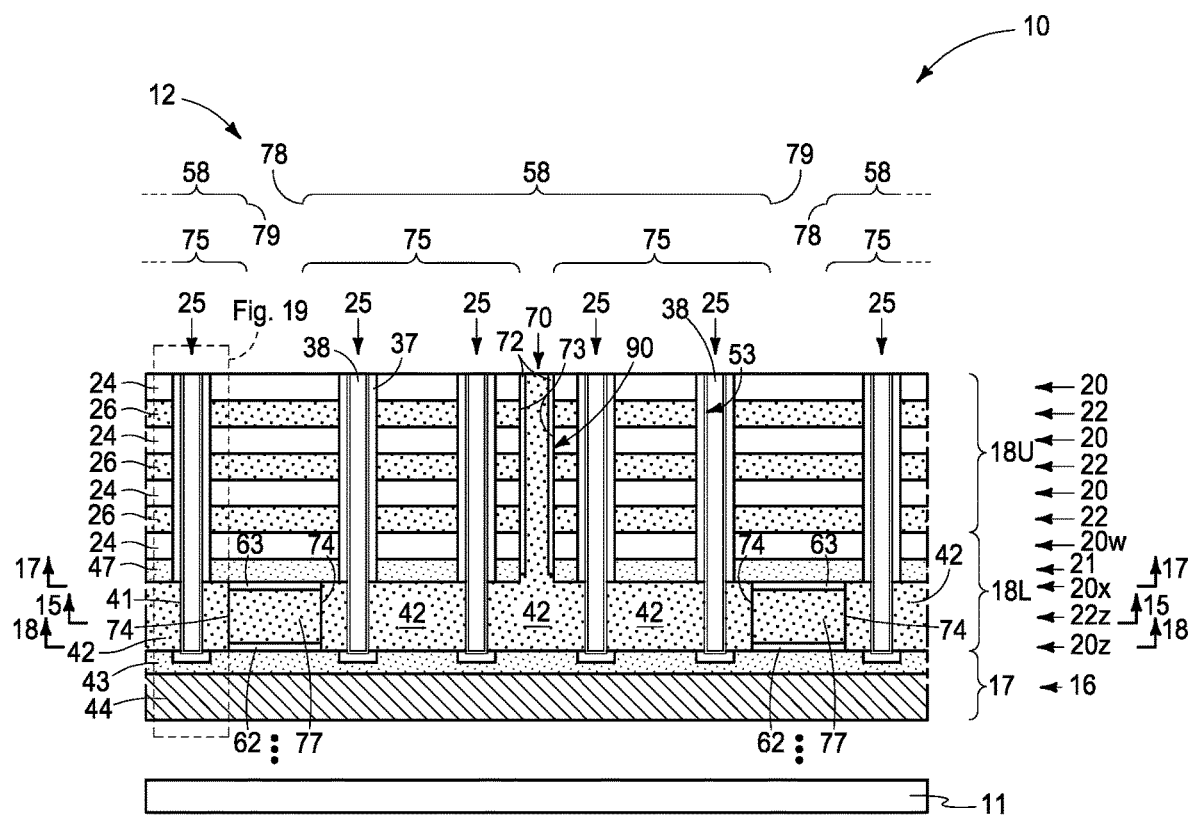
Figure 17:
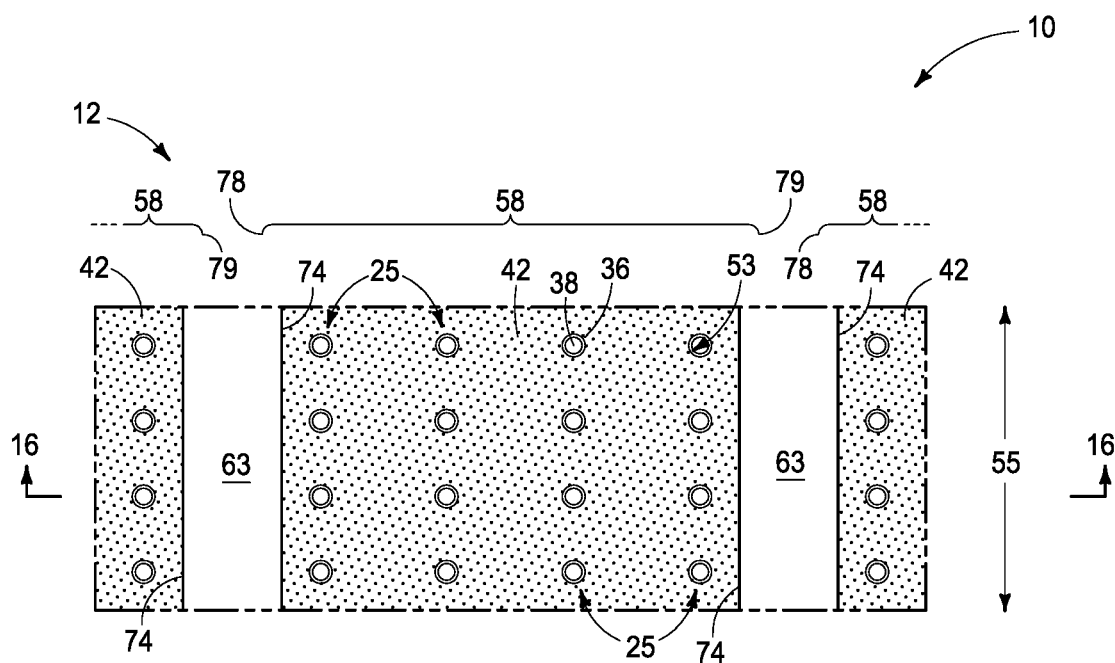
Figure 18:
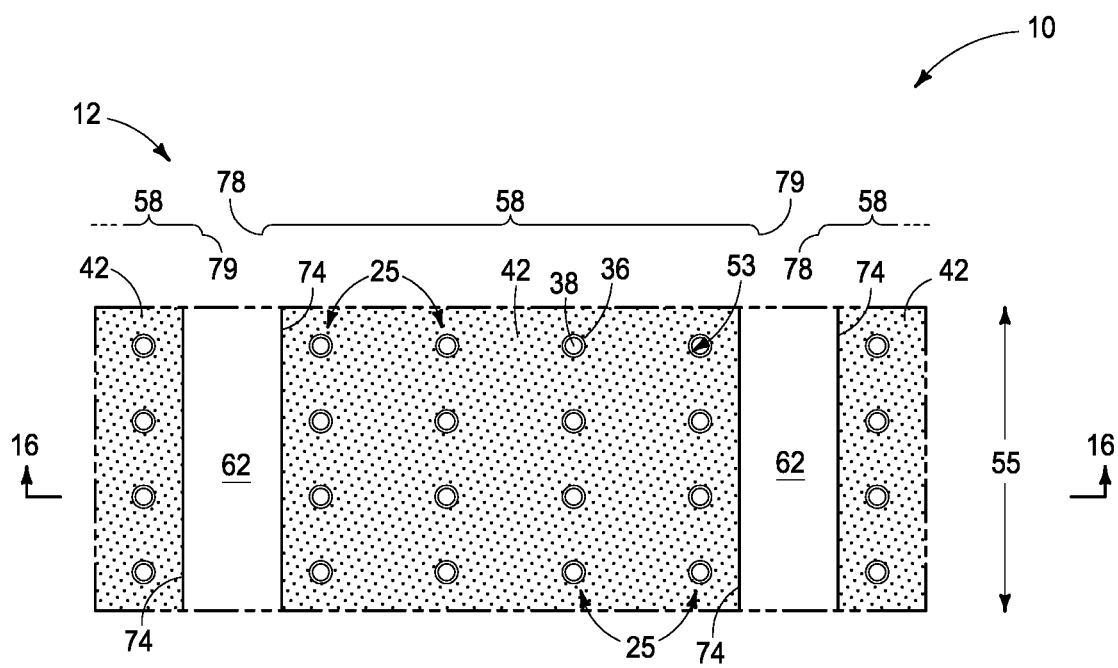
Figure 19:
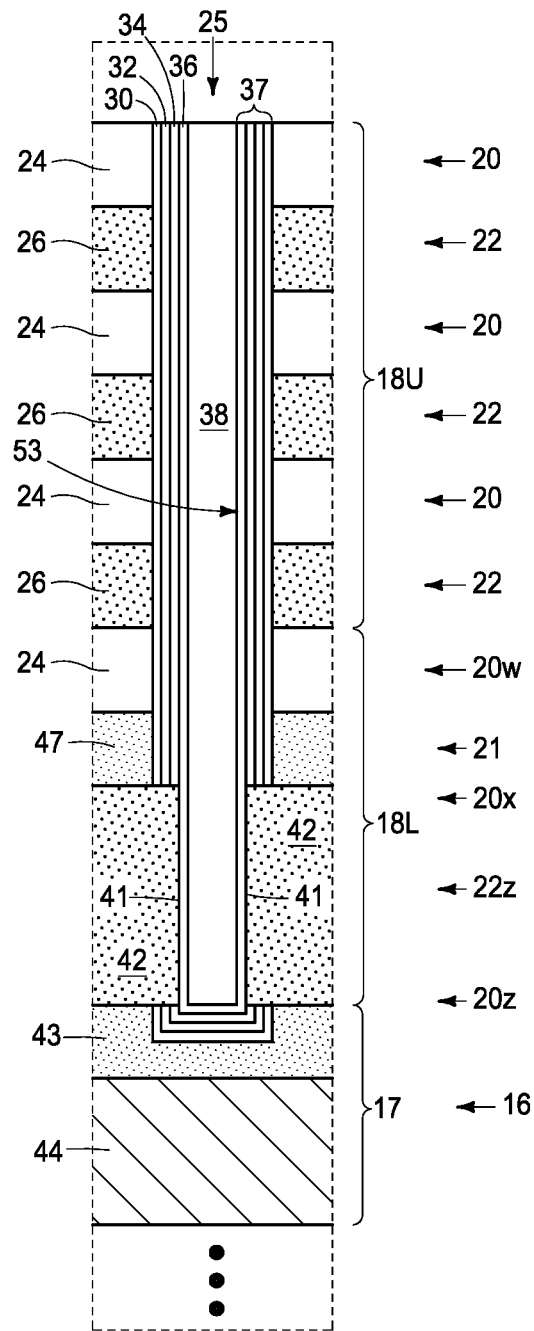

FIGS. 12-14 show example subsequent processing wherein, in one embodiment, material 30 (e.g., silicon dioxide), material 32 (e.g., silicon nitride), and material 34 (e.g., silicon dioxide or a combination of silicon dioxide and silicon nitride) have been etched in tier 22z to expose a sidewall 41 of channel material 36 of channel-material strings 53 in lowest first tier 22z. Any of materials 30, 32, and 34 in tier 22z may be considered as being sacrificial material therein. As an example, consider an embodiment where insulative lining 72 is one or more insulative oxides (other than silicon dioxide) or polysilicon, materials 62 and 63 are each one of a hafnium oxide or the $SiO_xN_y$, and memory-cell materials 30, 32, and 34 individually are one or more of silicon dioxide and silicon nitride layers. In such example, the depicted construction can result by using modified or different chemistries for sequentially etching silicon dioxide and silicon nitride selectively relative to the other. As examples, a solution of 100:1 (by volume) water to HF will etch silicon dioxide selectively relative to silicon nitride, whereas a solution of 1000:1 (by volume) water to HF will etch silicon nitride selectively relative to silicon dioxide. Accordingly, and in such example, such etching chemistries can be used in an alternating manner where it is desired to achieve the example depicted construction, with the example etching in one embodiment and as shown having been conducted selectively relative to materials 62 and 63 (and insulative lining 72 in one embodiment when present). The artisan is capable of selecting other chemistries for etching other different materials where a construction as shown is desired. Insulative lining 72, when present, may comprise alternating layers of silicon dioxide and silicon nitride and, regardless, may be partially or wholly etched (neither being shown) when etching to expose sidewall 41 of channel material 36.

Referring to FIGS. 15-19, after the isotropically etching, conducting material 42 (e.g., conductively-doped polysilicon) has been formed in horizontally-elongated slots 70 and in lower first tier 22z and that directly electrically couples together channel material 36 of individual of channel-material strings 53 and conductor material 17 of conductor tier 16. In one embodiment and as shown, conducting material 42 has been formed against insulative lining 72 in slots 70 when such is present. In one embodiment where the isotropically etching removes less-than-all of sacrificial material 77 from lower first tier 22z in memory-block regions 58, conducting material 42 is formed against laterally-inner sides 74 (relative to individual memory block regions 58) of sacrificial material 77 that extends continuously laterally between immediately-adjacent memory-block regions 58 in lower first tier 22z. In one embodiment, materials 63 and 62 comprise upper and lower insulative materials 63 and 62 having remnant sacrificial material 77 vertically there-between, with upper insulative material 63, lower insulative material 62, and remnant sacrificial material 77 extending longitudinally-along individual memory-block regions 58 proximate each of two laterally-outer sides 78, 79 of individual memory-block regions 58 in a finished construction of the memory array being formed.

Figure 20:
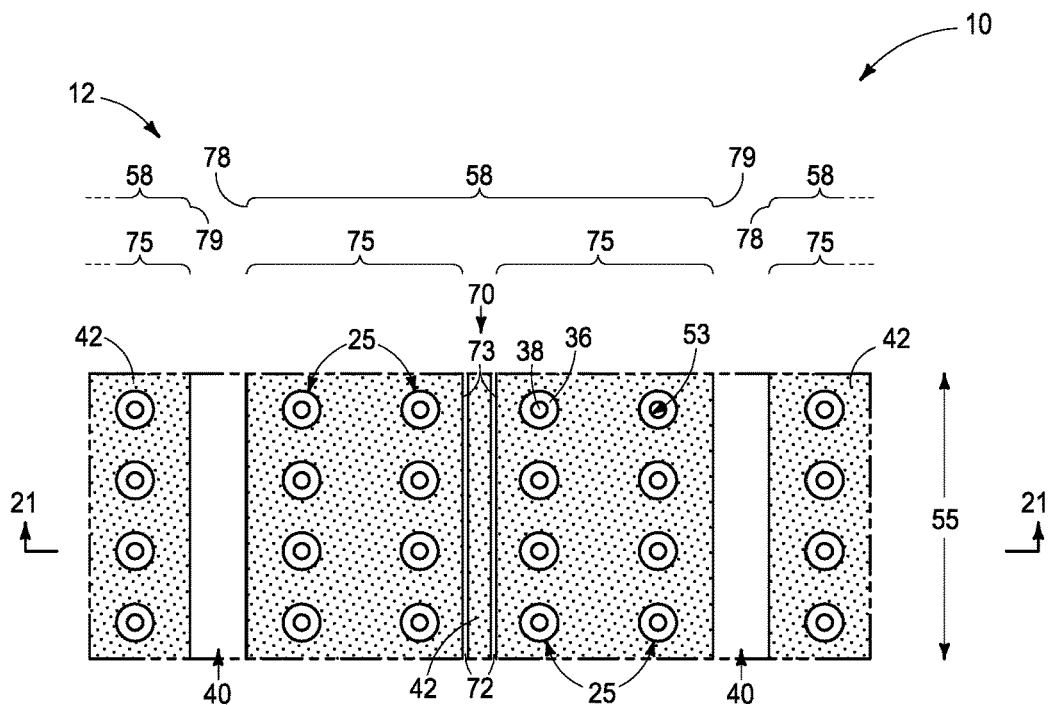
Figure 21:
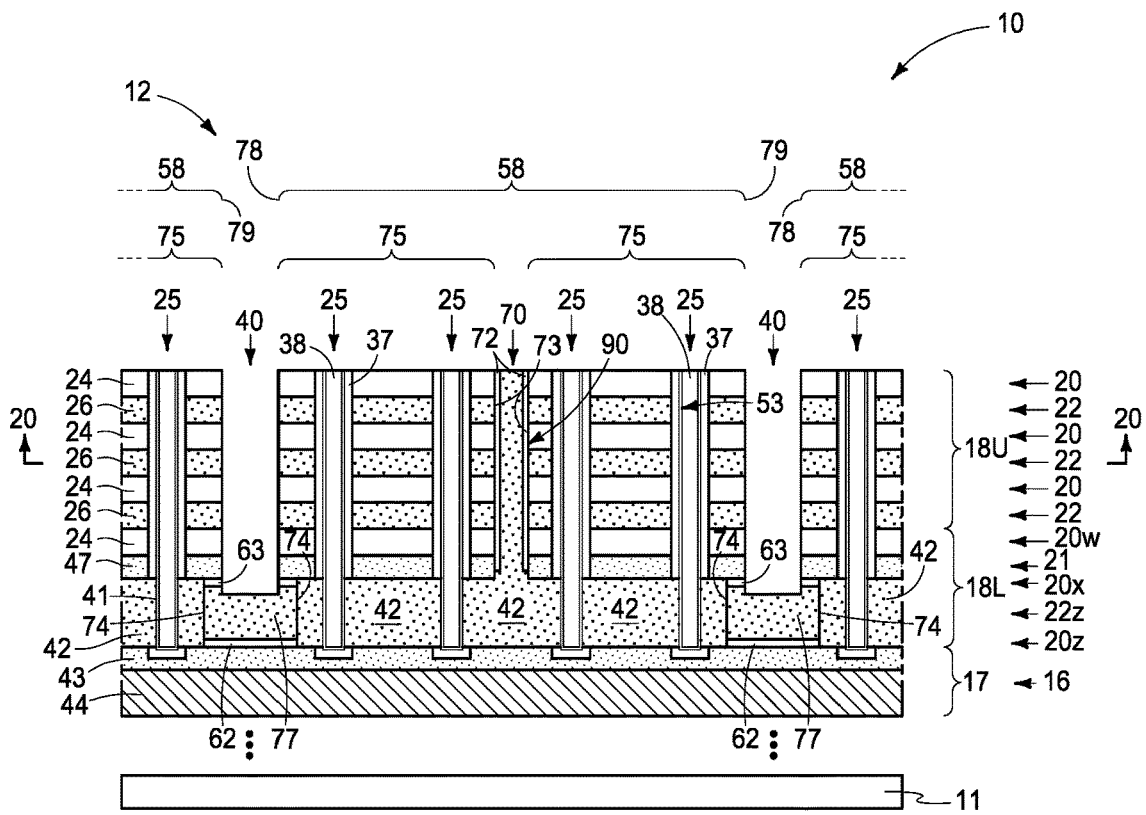
Figure 22:
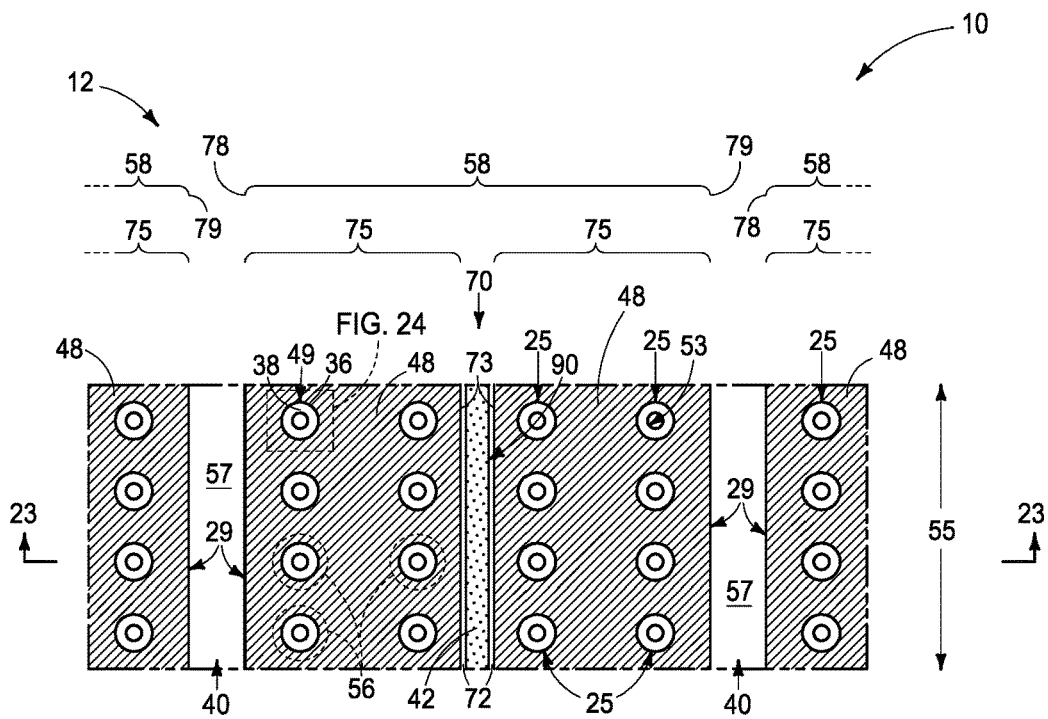
Figure 23:
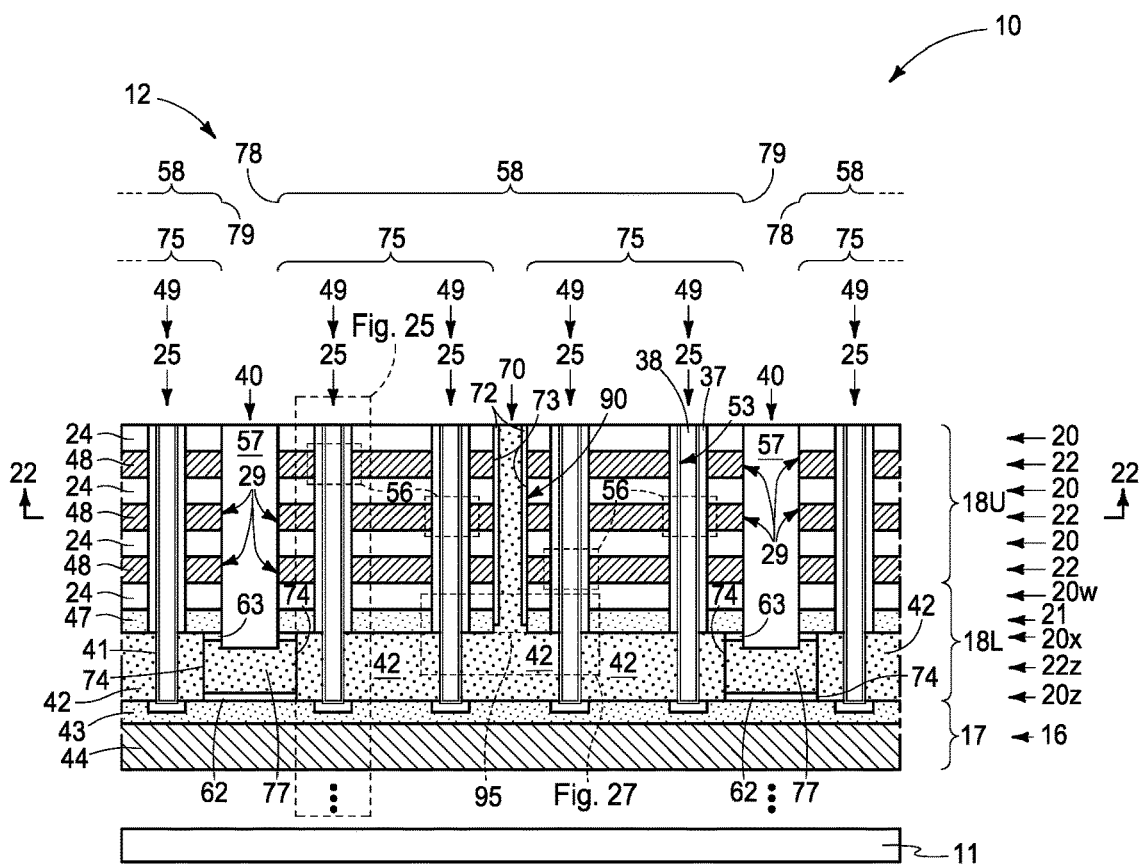
Figure 24:
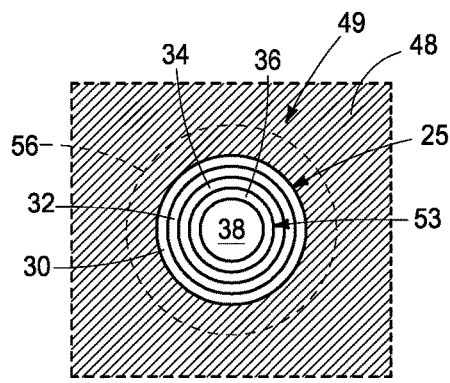
Figure 26:
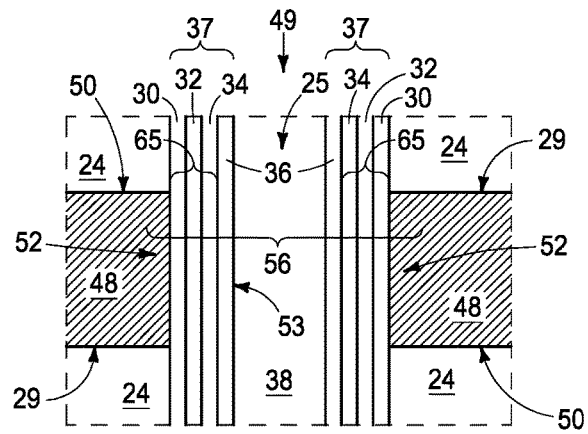
Figure 25:
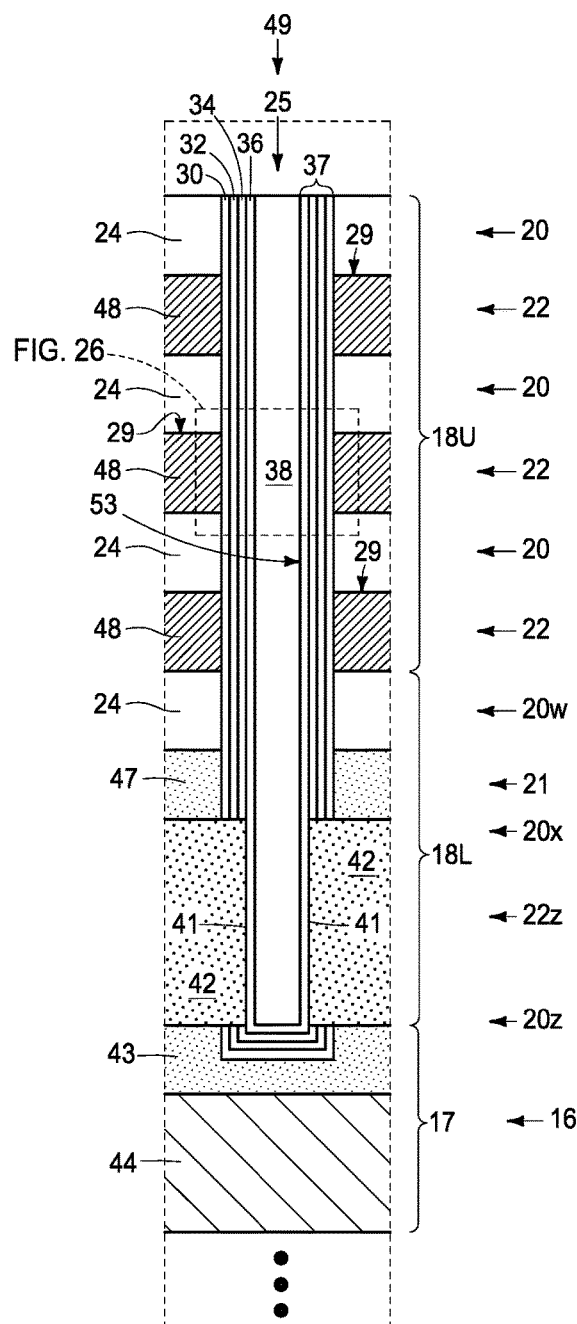
Figure 27:
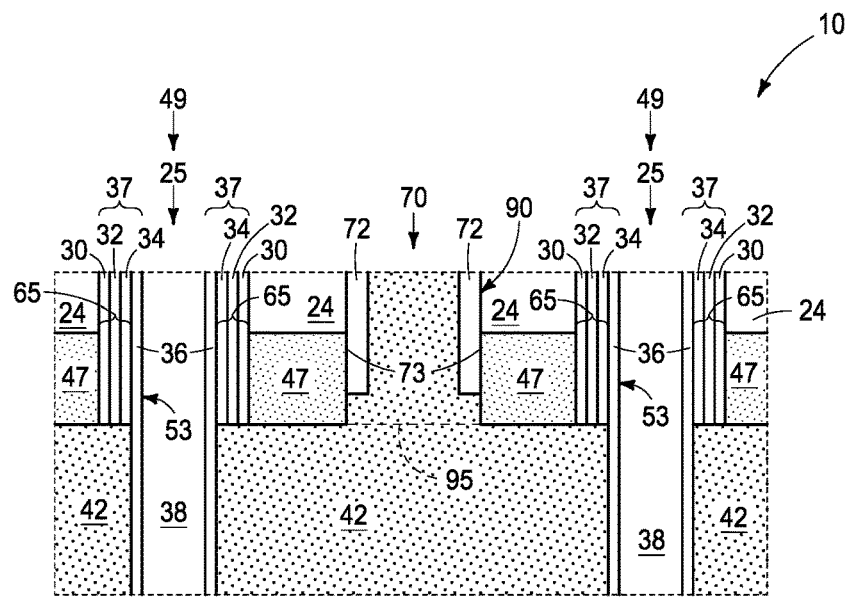
Figure 28:
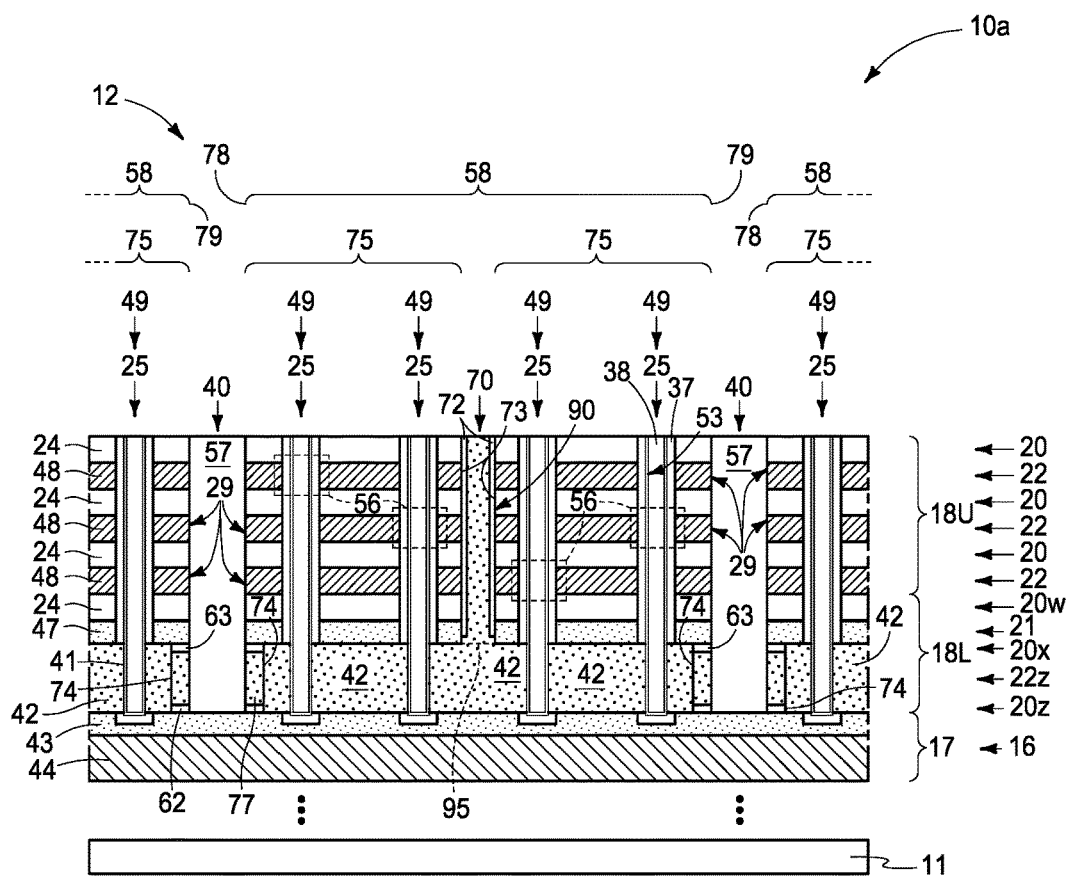

Referring to FIGS. 20 and 21, after forming conducting material 42, horizontally-elongated trenches 40 have been formed through first tiers 22* and second tiers 20* and that are individually laterally between immediately-adjacent memory-block regions 58. Trenches 40 may taper laterally-inward in vertical cross-section moving deeper into stack 18. In one embodiment and as shown, trenches 40 have been formed to extend to remnant material 77 (if/when present) of lowest first tier 22z. As one example, trenches 40 may initially be formed by etching materials 24, 26, 57, and 63 (likely using different anisotropic etching chemistries) and that stops on or within material 77. Alternately, and by way of example only, a sacrificial etch-stop line (not shown) having the same general horizontal outline as trenches 40 may individually be formed in conducting tier 21 (when present) directly above and in contact with material 63 of next-lowest second tier 20x before forming upper portion 18U. Trenches 40 may then be formed by etching materials 24 and 26 to stop on or within the material of the individual sacrificial lines, followed by exhuming remaining material of such sacrificial lines to form the example construction as shown in FIGS. 20 and 21. Regardless, in one embodiment, horizontally-elongated trenches 40 are formed to terminate directly above conductor tier 16 (i.e., individually having a bottom that is directly above conductor material 17). Alternately, in one embodiment, horizontally-elongated trenches 40 are formed to extend to conductor tier 16 (e.g., as may occur in forming a construction 10a in FIG. 28 [further referred to below]).

Referring to FIGS. 22-27, material 26 (not shown) of conductive tiers 22 has been removed, for example by being isotropically etched away through trenches 40 ideally selectively relative to the other exposed materials (e.g., using liquid or vapor $H_3PO_4$ as a primary etchant where material 26 is silicon nitride and other materials comprise one or more oxides or polysilicon). Material 26 (not shown) in conductive tiers 22 in the example embodiment is sacrificial and has been replaced with conducting material 48, and which has thereafter been removed from trenches 40, thus forming individual conductive lines 29 (e.g., wordlines) and elevationally-extending strings 49 of individual transistors and/or memory cells 56.

A thin insulative liner (e.g., $Al_2O_3$ and not shown) may be formed before forming conducting material 48. Approximate locations of some transistors and/or some memory cells 56 are indicated with a bracket or with dashed outlines, with transistors and/or memory cells 56 being essentially ring-like or annular in the depicted example. Alternately, transistors and/or memory cells 56 may not be completely encircling relative to individual channel openings 25 such that each channel opening 25 may have two or more elevationally-extending strings 49 (e.g., multiple transistors and/or memory cells about individual channel openings in individual conductive tiers with perhaps multiple wordlines per channel opening in individual conductive tiers, and not shown). Conducting material 48 may be considered as having terminal ends 50 corresponding to control-gate regions 52 of individual transistors and/or memory cells 56. Control-gate regions 52 in the depicted embodiment comprise individual portions of individual conductive lines 29. Materials 30, 32, and 34 may be considered as a memory structure 65 that is laterally between control-gate region 52 and channel material 36. In one embodiment and as shown with respect to the example "gate-last" processing, conducting material 48 of conductive tiers 22* is formed after forming openings 25 and/or trenches 40. Alternately, the conducting material of the conductive tiers may be formed before forming channel openings 25 and/or trenches 40 (not shown), for example with respect to "gate-first" processing.

A charge-blocking region (e.g., charge-blocking material 30) is between storage material 32 and individual control-gate regions 52. A charge block may have the following functions in a memory cell: In a program mode, the charge block may prevent charge carriers from passing out of the storage material (e.g., floating-gate material, charge-trapping material, etc.) toward the control gate, and in an erase mode the charge block may prevent charge carriers from flowing into the storage material from the control gate. Accordingly, a charge block may function to block charge migration between the control-gate region and the storage material of individual memory cells. An example charge-blocking region as shown comprises insulator material 30. By way of further examples, a charge-blocking region may comprise a laterally (e.g., radially) outer portion of the storage material (e.g., material 32) where such storage material is insulative (e.g., in the absence of any different-composition material between an insulative storage material 32 and conducting material 48). Regardless, as an additional example, an interface of a storage material and conductive material of a control gate may be sufficient to function as a charge-blocking region in the absence of any separatecomposition-insulator material 30. Further, an interface of conducting material 48 with material 30 (when present) in combination with insulator material 30 may together function as a charge-blocking region, and as alternately or additionally may a laterally-outer region of an insulative storage material (e.g., a silicon nitride material 32). An example material 30 is one or more of silicon hafnium oxide and silicon dioxide.

Intervening material 57 has been formed in trenches 40 and thereby laterally-between and longitudinally-along immediately-laterally-adjacent memory blocks 58. Intervening material 57 may provide lateral electrical isolation (insulation) between immediately-laterally-adjacent memory blocks. Such may include one or more of insulative, semiconductive, and conducting materials and, regardless, may facilitate conductive tiers 22 from shorting relative one another in a finished circuitry construction. Example insulative materials are one or more of $SiO_2$, $Si_3N_4$, $Al_2O_3$, and undoped polysilicon. Intervening material 57 may include through array vias (not shown).

Any other attribute(s) or aspect(s) as shown and/or described herein with respect to other embodiments may be used in the embodiments shown and described with reference to the above embodiments.

Alternate embodiment constructions may result from method embodiments described above, or otherwise. Regardless, embodiments of the invention encompass memory arrays independent of method of manufacture. Nevertheless, such memory arrays may have any of the attributes as described herein in method embodiments. Likewise, the above-described method embodiments may incorporate, form, and/or have any of the attributes described with respect to device embodiments.

In one embodiment, a memory array (e.g., 12) comprising strings (e.g., 49) of memory cells (e.g., 56) comprises a conductor tier (e.g., 16) comprising conductor material (e.g., 17). The memory array includes laterally-spaced memory blocks (e.g., 58) individually comprising a vertical stack (e.g., 18*) comprising alternating insulative tiers (e.g., 20) and conductive tiers (e.g., 22) directly above the conductor tier. Channel-material strings (e.g., 53) of memory cells (e.g., 56) extend through the insulative tiers and the conductive tiers. Conducting material (e.g., 42) of a lower (e.g., 22z) of the conductive tiers (e.g., 22*) directly electrically couples together channel material (e.g., 36) of individual of the channel-material strings and the conductor material of the conductor tier. Individual of the memory blocks in the lower conductive tier comprise upper and lower insulative materials (e.g., 63, 62, respectively) having intermediate material (e.g., 77) of different composition from the upper and lower insulative materials vertically there-between. The upper and lower insulative materials and the intermediate material extend longitudinally-along the individual memory blocks proximate each of two laterally-outer sides (e.g., 78, 79) of the individual memory blocks. The conducting material is against laterally-inner sides (e.g., 74) of the upper insulative material, the lower insulative material, and the intermediate material in the individual memory blocks.

In one embodiment, the upper insulative material and the lower insulative material are of the same composition relative one another, and in one such embodiment which is silicon dioxide. In one embodiment, the upper insulative material and the lower insulative material are of different compositions relative one another. In one embodiment, the intermediate material is insulative, in another embodiment is conductive, and in still another embodiment is semiconductive. In one embodiment, the intermediate material comprises polysilicon and in one such embodiment each of the upper insulative material and the lower insulative material comprises silicon dioxide.

In one embodiment, at least one of the upper insulative material, the lower insulative material, and the intermediate material extends continuously laterally between immediately-adjacent of the memory-block regions in a vertical cross-section. In one such embodiment, only the intermediate material and the lower insulative material of the upper insulative material, the lower insulative material, and the intermediate material extend continuously laterally between immediately-adjacent of the memory-block regions in the vertical cross-section.

In one embodiment, none of the upper insulative material, the lower insulative material, and the intermediate material extends continuously laterally between immediately-adjacent of the memory-block regions. See, for example, construction 10a in FIG. 28. Like numerals from the above-described embodiments have been used where appropriate, with some construction differences being indicated with the suffix "a" or with different numerals.

Any other attribute(s) or aspect(s) as shown and/or described herein with respect to other embodiments may be used.

In one embodiment, a memory array (e.g., 12) comprising strings (e.g., 49) of memory cells (e.g., 56) comprises a conductor tier (e.g., 16) comprising conductor material (e.g., 17). The memory array includes laterally-spaced memory blocks (e.g., 58) individually comprising a vertical stack (e.g., 18*) comprising alternating insulative tiers (e.g., 20) and conductive tiers (e.g., 22) directly above the conductor tier. Channel-material strings (e.g., 53) of memory cells (e.g., 56) extend through the insulative tiers and the conductive tiers. Channel material (e.g., 36) of individual of the channel-material strings are directly electrically coupled to the conductor material of the conductor tier. Individual of the memory blocks comprise a lowest of the conductive tiers (e.g., 22z; having no other of the conductive tiers vertically between the lowest conductive tier and the conductor tier). The lowest conductive tier comprises upper and lower insulative materials (e.g., 63, 62, respectively) having intermediate material (e.g., 77) of different composition from the upper and lower insulative materials vertically there-between. The upper insulative material, the lower insulative material, and the intermediate material extend longitudinally-along the individual memory blocks proximate each of two laterally-outer sides (e.g., 78, 79) of the individual memory blocks. Any other attribute(s) or aspect(s) as shown and/or described herein with respect to other embodiments may be used.

In one embodiment, a memory array (e.g., 12) comprising strings (e.g., 49) of memory cells (e.g., 56) comprises a conductor tier (e.g., 16) comprising conductor material (e.g., 17). The memory array includes laterally-spaced memory blocks (e.g., 58) individually comprising a vertical stack (e.g., 18*) comprising alternating insulative tiers (e.g., 20) and conductive tiers (e.g., 22) directly above the conductor tier. Individual of the memory blocks comprise sub-blocks (e.g., 75) defined at least in part by a wall (e.g., 90) that extends through an upper portion (e.g., 18U) of the vertical stack into a lower portion (e.g., 18L) of the vertical stack between two laterally-outer sides (e.g., 78, 79) of the individual memory blocks. Channel-material strings (e.g., 53) of memory cells (e.g., 56) extend through the upper portion and into the lower portion in the sub-blocks. Conducting material (e.g., 42) in the lower portion directly electrically couples together the channel material of individual of the channel-material strings and the conductor material of the conductor tier. The individual memory blocks in the lower portion comprise upper and lower insulative materials (e.g., 63, 62, respectively) having intermediate material (e.g., 77) of different composition from the upper and lower insulative materials vertically there-between. The upper and lower insulative materials and the intermediate material extend longitudinally-along the individual memory blocks proximate each of the two laterally-outer sides of the individual memory blocks. The conducting material is against (in one embodiment directly against) laterally-inner sides (e.g., 74) of the upper insulative material, the lower insulative material, and the intermediate material in the individual memory blocks.

In one embodiment, the wall in a vertical cross-section (e.g., that of FIG. 23) comprises a core material (e.g., 42) and an insulative lining (e.g., 72) laterally-outward of two laterally-outer sides of the core material. The insulative lining does not extend laterally across a bottom (e.g., 95) of the core material of the wall in the vertical cross-section.

Any other attribute(s) or aspect(s) as shown and/or described herein with respect to other embodiments may be used.

In one embodiment, a memory array (e.g., 12) comprising strings (e.g., 49) of memory cells (e.g., 56) comprises a conductor tier (e.g., 16) comprising conductor material (e.g., 17). The memory array includes laterally-spaced memory blocks (e.g., 58) individually comprising a vertical stack (e.g., 18*) comprising alternating insulative tiers (e.g., 20) and conductive tiers (e.g., 22) directly above the conductor tier. Channel-material strings (e.g., 53) of memory cells (e.g., 56) extend through the insulative tiers and the conductive tiers. Channel material (e.g., 36) of individual of the channel-material strings are directly electrically coupled to the conductor material of the conductor tier. Individual of the memory blocks comprise sub-blocks (e.g., 75) defined at least in part by a wall (e.g., 90) that extends through an upper portion (e.g., 18U) of the vertical stack into a lower portion (e.g., 18L) of the vertical stack between two laterally-outer sides (e.g., 78, 79) of the individual memory blocks. The wall in a vertical cross-section (e.g., that of FIG. 23) comprises a core material (e.g., 42) and an insulative lining (e.g., 72) laterally-outward of two laterally-outer sides of the core material. The insulative lining does not extend laterally across a bottom (e.g., 95) of the core material of the wall in the vertical cross-section. Any other attribute(s) or aspect(s) as shown and/or described herein with respect to other embodiments may be used.

The above processing(s) or construction(s) may be considered as being relative to an array of components formed as or within a single stack or single deck of such components above or as part of an underlying base substrate (albeit, the single stack/deck may have multiple tiers). Control and/or other peripheral circuitry for operating or accessing such components within an array may also be formed anywhere as part of the finished construction, and in some embodiments may be under the array (e.g., CMOS under-array). Regardless, one or more additional such stack(s)/deck(s) may be provided or fabricated above and/or below that shown in the figures or described above. Further, the array(s) of components may be the same or different relative one another in different stacks/decks and different stacks/decks may be of the same thickness or of different thicknesses relative one another. Intervening structure may be provided between immediately-vertically-adjacent stacks/decks (e.g., additional circuitry and/or dielectric layers). Also, different stacks/decks may be electrically coupled relative one another. The multiple stacks/decks may be fabricated separately and sequentially (e.g., one atop another), or two or more stacks/decks may be fabricated at essentially the same time.

The assemblies and structures discussed above may be used in integrated circuits/circuitry and may be incorporated into electronic systems. Such electronic systems may be used in, for example, memory modules, device drivers, power modules, communication modems, processor modules, and application-specific modules, and may include multilayer, multichip modules. The electronic systems may be any of a broad range of systems, such as, for example, cameras, wireless devices, displays, chip sets, set top boxes, games, lighting, vehicles, clocks, televisions, cell phones, personal computers, automobiles, industrial control systems, aircraft, etc.

In this document unless otherwise indicated, "elevational", "higher", "upper", "lower", "top", "atop", "bottom", "above", "below", "under", "beneath", "up", and "down" are generally with reference to the vertical direction. "Horizontal" refers to a general direction (i.e., within 10 degrees) along a primary substrate surface and may be relative to which the substrate is processed during fabrication, and vertical is a direction generally orthogonal thereto. Reference to "exactly horizontal" is the direction along the primary substrate surface (i.e., no degrees there-from) and may be relative to which the substrate is processed during fabrication. Further, "vertical" and "horizontal" as used herein are generally perpendicular directions relative one another and independent of orientation of the substrate in three-dimensional space. Additionally, "elevationally-extending" and "extend(ing) elevationally" refer to a direction that is angled away by at least 45° from exactly horizontal. Further, "extend(ing) elevationally", "elevationally-extending", "extend(ing) horizontally", "horizontally-extending" and the like with respect to a field effect transistor are with reference to orientation of the transistor's channel length along which current flows in operation between the source/drain regions. For bipolar junction transistors, "extend(ing) elevationally" "elevationally-extending", "extend(ing) horizontally", "horizontally-extending" and the like, are with reference to orientation of the base length along which current flows in operation between the emitter and collector. In some embodiments, any component, feature, and/or region that extends elevationally extends vertically or within 10° of vertical.

Further, "directly above", "directly below", and "directly under" require at least some lateral overlap (i.e., horizontally) of two stated regions/materials/components relative one another. Also, use of "above" not preceded by "directly" only requires that some portion of the stated region/material/component that is above the other be elevationally outward of the other (i.e., independent of whether there is any lateral overlap of the two stated regions/materials/components). Analogously, use of "below" and "under" not preceded by "directly" only requires that some portion of the stated region/material/component that is below/under the other be elevationally inward of the other (i.e., independent of whether there is any lateral overlap of the two stated regions/materials/components).

Any of the materials, regions, and structures described herein may be homogenous or non-homogenous, and regardless may be continuous or discontinuous over any material which such overlie. Where one or more example composition(s) is/are provided for any material, that material may comprise, consist essentially of, or consist of such one or more composition(s). Further, unless otherwise stated, each material may be formed using any suitable existing or future-developed technique, with atomic layer deposition, chemical vapor deposition, physical vapor deposition, epitaxial growth, diffusion doping, and ion implanting being examples.

Additionally, "thickness" by itself (no preceding directional adjective) is defined as the mean straight-line distance through a given material or region perpendicularly from a closest surface of an immediately-adjacent material of different composition or of an immediately-adjacent region. Additionally, the various materials or regions described herein may be of substantially constant thickness or of variable thicknesses. If of variable thickness, thickness refers to average thickness unless otherwise indicated, and such material or region will have some minimum thickness and some maximum thickness due to the thickness being variable. As used herein, "different composition" only requires those portions of two stated materials or regions that may be directly against one another to be chemically and/or physically different, for example if such materials or regions are not homogenous. If the two stated materials or regions are not directly against one another, "different composition" only requires that those portions of the two stated materials or regions that are closest to one another be chemically and/or physically different if such materials or regions are not homogenous. In this document, a material, region, or structure is "directly against" another when there is at least some physical touching contact of the stated materials, regions, or structures relative one another. In contrast, "over", "on", "adjacent", "along", and "against" not preceded by "directly" encompass "directly against" as well as construction where intervening material(s), region(s), or structure(s) result(s) in no physical touching contact of the stated materials, regions, or structures relative one another.

Herein, regions-materials-components are "electrically coupled" relative one another if in normal operation electric current is capable of continuously flowing from one to the other and does so predominately by movement of subatomic positive and/or negative charges when such are sufficiently generated. Another electronic component may be between and electrically coupled to the regions-materials-components. In contrast, when regions-materials-components are referred to as being "directly electrically coupled", no intervening electronic component (e.g., no diode, transistor, resistor, transducer, switch, fuse, etc.) is between the directly electrically coupled regions-materials-components.

Any use of "row" and "column" in this document is for convenience in distinguishing one series or orientation of features from another series or orientation of features and along which components have been or may be formed. "Row" and "column" are used synonymously with respect to any series of regions, components, and/or features independent of function. Regardless, the rows may be straight and/or curved and/or parallel and/or not parallel relative one another, as may be the columns. Further, the rows and columns may intersect relative one another at 90° or at one or more other angles (i.e., other than the straight angle).

The composition of any of the conductive/conductor/conducting materials herein may be metal material and/or conductively-doped semiconductive/semiconductor/semiconducting material. "Metal material" is any one or combination of an elemental metal, any mixture or alloy of two or more elemental metals, and any one or more conductive metal compound(s).

Herein, any use of "selective" as to etch, etching, removing, removal, depositing, forming, and/or formation is such an act of one stated material relative to another stated material(s) so acted upon at a rate of at least 2:1 by volume. Further, any use of selectively depositing, selectively growing, or selectively forming is depositing, growing, or forming one material relative to another stated material or materials at a rate of at least 2:1 by volume for at least the first 75 Angstroms of depositing, growing, or forming.

Unless otherwise indicated, use of "or" herein encompasses either and both.

CONCLUSION

In some embodiments, a method used in forming a memory array comprising strings of memory cells comprises forming a conductor tier comprising conductor material on a substrate. Laterally-spaced memory-block regions individually comprise a vertical stack comprising alternating first tiers and second tiers are formed directly above the conductor tier. Channel-material strings of memory cells extend through the first tiers and the second tiers. A lower of the first tiers comprises sacrificial material. A horizontally-elongated slot is formed through the first and second tiers to the sacrificial material in individual of the memory-block regions to form laterally-spaced sub-block regions in the individual memory-block regions. The sacrificial material is isotropically etched from the lower first tier through the horizontally-elongated slots. After the isotropic etching, conducting material is formed in the horizontally-elongated slots and in the lower first tier that directly electrically couples together the channel material of individual of the channel-material strings and the conductor material of the conductor tier. After forming the conducting material, horizontally-elongated trenches are formed through the first tiers and the second tiers and that are individually laterally between immediately-adjacent of the memory-block regions.

In some embodiments, a memory array comprising strings of memory cells comprises a conductor tier comprising conductor material. Laterally-spaced memory blocks individually comprise a vertical stack comprising alternating insulative tiers and conductive tiers directly above the conductor tier. Channel-material strings of memory cells extend through the insulative tiers and the conductive tiers. Conducting material of a lower of the conductive tiers directly electrically couples together the channel material of individual of the channel-material strings and the conductor material of the conductor tier. Individual of the memory blocks in the lower conductive tier comprise upper and lower insulative materials having intermediate material of different composition from the upper and lower insulative materials vertically there-between. The upper and lower insulative materials and the intermediate material extend longitudinally-along the individual memory blocks proximate each of two laterally-outer sides of the individual memory blocks. The conducting material is against laterally-inner sides of the upper insulative material, the lower insulative material, and the intermediate material in the individual memory blocks.

In some embodiments, a memory array comprising strings of memory cells comprises a conductor tier comprising conductor material. Laterally-spaced memory blocks individually comprise a vertical stack comprising alternating insulative tiers and conductive tiers directly above the conductor tier. Channel-material strings of memory cells extend through the insulative tiers and the conductive tiers. The channel material of individual of the channel-material strings is directly electrically coupled to the conductor material of the conductor tier. Individual of the memory blocks comprises a lowest of the conductive tiers having no other of the conductive tiers vertically between the lowest conductive tier and the conductor tier. The lowest conductive tier comprises upper and lower insulative materials having intermediate material of different composition from the upper and lower insulative materials vertically therebetween. The upper insulative material, the lower insulative material, and the intermediate material extend longitudinally-along the individual memory blocks proximate each of two laterally-outer sides of the individual memory blocks.

In some embodiments, a memory array comprising strings of memory cells comprises a conductor tier comprising conductor material. Laterally-spaced memory blocks individually comprise a vertical stack comprising alternating insulative tiers and conductive tiers directly above the conductor tier. Individual of the memory blocks comprise sub-blocks defined at least in part by a wall that extends through an upper portion of the vertical stack into a lower portion of the vertical stack between two laterally-outer sides of the individual memory blocks. Channel-material strings of memory cells extend through the upper portion and into the lower portion in the sub-blocks. Conducting material in the lower portion directly electrically couples together the channel material of individual of the channel-material strings and the conductor material of the conductor tier. The individual memory blocks in the lower portion comprise upper and lower insulative materials having intermediate material of different composition from the upper and lower insulative materials vertically there-between. The upper and lower insulative materials and the intermediate material extend longitudinally-along the individual memory blocks proximate each of the two laterally-outer sides of the individual memory blocks. The conducting material is against laterally-inner sides of the upper insulative material, the lower insulative material, and the intermediate material in the individual memory blocks.

In some embodiments, a memory array comprising strings of memory cells comprises a conductor tier comprising conductor material. Laterally-spaced memory blocks individually comprise a vertical stack comprising alternating insulative tiers and conductive tiers directly above the conductor tier. Channel-material strings of memory cells extend through the insulative tiers and the conductive tiers. The channel material of individual of the channel-material strings is directly electrically coupled to the conductor material of the conductor tier. Individual of the memory blocks comprises sub-blocks defined at least in part by a wall that extends through an upper portion of the vertical stack into a lower portion of the vertical stack between two laterally-outer sides of the individual memory blocks. A lowest of the conductive tiers has no other of the conductive tiers vertically between the lowest conductive tier and the conductor tier. The wall in a vertical cross-section comprises a core material and an insulative lining laterally-outward of two laterally-outer sides of the core material. The insulative lining not extends laterally across a bottom of the core material of the wall in the vertical cross-section.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

The invention claimed is:

1. A method used in forming a memory array comprising strings of memory cells, comprising:

forming a conductor tier comprising conductor material on a substrate;

forming memory-block regions individually comprising a vertical stack comprising alternating first tiers and second tiers directly above the conductor tier, the memory-block regions being laterally-spaced relative one another in a horizontal first direction by a spacing region and being longitudinally-elongated along a horizontal second direction that is orthogonal relative to the horizontal first direction, channel-material strings of memory cells extending through the first tiers and the second tiers, a lower of the first tiers comprising sacrificial material;

forming a slot that is horizontally elongated in the horizontal second direction and that extends vertically through the first tiers and the second tiers to the sacrificial material in individual of the memory-block regions to form sub-block regions in the individual memory-block regions that are laterally spaced relative one another in the horizontal first direction, the sub-block regions being longitudinally-elongated along the horizontal second direction on opposing lateral sides of the slot;

isotropically etching the sacrificial material from the lower first tier through the slot, a region of the sacrificial material being retained in the spacing region;

after the isotropically etching, forming conducting material in the slot and in the lower first tier that directly electrically couples together the channel material of individual of the channel-material strings and the conductor material of the conductor tier, the conducting material extending vertically through the first tiers and the second tiers in the slot and horizontally along the horizontal first direction in the slot in a finished construction of the memory array; and after forming the conducting material, forming trenches that are horizontally elongated in the horizontal second direction and that extend vertically through the first tiers and the second tiers and that are individually in the spacing region laterally between immediately-adjacent of the memory-block regions, the trenches individually comprising a vertical portion that extends through the first tiers and the second tiers, the vertical portion being laterally spaced from the slot in the horizontal first direction, the retained sacrificial material within the spacing region being present along a bottom of the trenches.

2. The method of claim 1 comprising forming channel material of the channel-material strings prior to forming the slot.

3. The method of claim 1 comprising forming an insulative lining against sidewalls of the slot before the isotropically etching.

4. The method of claim 3 comprising:

forming the insulative lining against a bottom of the slot; and removing the insulative lining from being centrally over the bottoms of the slot to expose the sacrificial material before the isotropically etching.

5. The method of claim 3 comprising forming the conducting material against the insulative lining in the slot.

6. The method of claim 1 wherein the isotropically etching removes less-than-all of the sacrificial material from the lower first tier in the memory-block regions.

7. The method of claim 6 wherein the isotropically etching leaves the sacrificial material to extend continuously laterally between immediately-adjacent of the memory-block regions in the lower first tier.

8. The method of claim 7 comprising forming the conducting material against laterally-inner sides of the sacrificial material that extends continuously laterally between immediately-adjacent of the memory-block regions in the lower first tier.

9. The method of claim 7 wherein the sacrificial material extending continuously laterally between immediately-adjacent of the memory-block regions in the lower first tier remains in a finished construction of the memory array.

10. The method of claim 9 comprising forming the conducting material against laterally-inner sides of the sacrificial material that extends continuously laterally between immediately-adjacent of the memory-block regions in the lower first tier.

11. The method of claim 10 comprising upper and lower insulative materials having remnant of the sacrificial material vertically there-between; the upper insulative material, the lower insulative material and the remnant sacrificial material extending longitudinally-along the individual memory-block regions proximate each of two laterally-outer sides of the individual memory-block regions in the finished construction.

12. The method of claim 1 comprising forming the trenches to extend to the conductor tier.

13. The method of claim 1 comprising forming the trenches to terminate directly above the conductor tier.

14. The method of claim 1 wherein the retained sacrificial material within the spacing region is present in the final construction.

15. A method used in forming a memory array comprising strings of memory cells, comprising:
   forming a conductor tier comprising conductor material on a substrate;
   forming memory-block regions individually comprising a vertical stack comprising alternating first tiers and second tiers directly above the conductor tier, the memory-block regions being laterally-spaced relative one another in a horizontal first direction and being longitudinally-elongated along a horizontal second direction that is orthogonal relative to the horizontal first direction, channel-material strings of memory cells extending through the first tiers and the second tiers, a lower of the first tiers comprising sacrificial material;
   forming a slot that is horizontally elongated in the horizontal second direction and that extends vertically through the first tiers and the second tiers to the sacrificial material in individual of the memory-block regions to form sub-block regions in the individual memory-block regions that are laterally spaced relative one another in the horizontal first direction, the sub-block regions being longitudinally-elongated along the horizontal second direction on opposing lateral sides of the slot;
   isotropically etching the sacrificial material from the lower first tier through the slot;
   after the isotropically etching, forming conducting material in the slot and in the lower first tier that directly electrically couples together the channel material of individual of the channel-material strings and the conductor material of the conductor tier, the conducting material extending vertically through the first tiers and the second tiers in the slot and horizontally along the horizontal first direction in the slot in a finished construction of the memory array;
   after forming the conducting material, forming trenches that are horizontally elongated in the horizontal second direction and that extend vertically through the first tiers and the second tiers and that are individually laterally between immediately-adjacent of the memory-block regions, the trenches individually comprising a vertical portion that extends through the first tiers and the second tiers, the vertical portion being laterally spaced from the slot in the horizontal first direction; and
   individual of the memory-block regions comprising a lowest of the first tiers having no other of the first tiers vertically between the lowest first tier and the conductor tier, the lowest first tier being said lower first tier, the lowest first tier comprising upper and lower insulative materials having intermediate material of different composition from the upper and lower insulative materials vertically there-between; the upper insulative material, the lower insulative material, and the intermediate material extending longitudinally-along the individual memory-block regions proximate each of two laterally-outer sides of the individual memory-block regions.

16. The method of claim 15 wherein, in the finished construction of the memory array, at least one of the upper insulative material, the lower insulative material, and the intermediate material extends continuously laterally between immediately-adjacent of the memory-block regions in a vertical cross-section.

17. The method of claim 16 wherein, in the finished construction of the memory array, only the intermediate material and the lower insulative material of the upper insulative material, the lower insulative material, and the intermediate material extends continuously laterally between immediately-adjacent of the memory-block regions in the vertical cross-section.

18. The method of claim 15 wherein, in the finished construction of the memory array, none of the upper insulative material, the lower insulative material, and the intermediate material extends continuously laterally between immediately-adjacent of the memory-block regions.

19. The method of claim 15 wherein, in the finished construction of the memory array, the intermediate material comprises polysilicon and each of the upper insulative material and the lower insulative material comprises silicon dioxide.

* * * * *